United States Patent
Hwang et al.

(10) Patent No.: US 11,099,809 B2
(45) Date of Patent: Aug. 24, 2021

(54) DISPLAY APPARATUS AND CONTROL METHOD THEREOF

(71) Applicant: Samsung Electronics Co., Ltd., Suwon-si (KR)

(72) Inventors: Sung-jun Hwang, Suwon-si (KR); Dong-hun Shin, Seoul (KR); Young-ah Lee, Seoul (KR); Arum Choi, Seongnam-si (KR); Jae Julien, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 16/171,761

(22) Filed: Oct. 26, 2018

(65) Prior Publication Data

US 2019/0146752 A1    May 16, 2019

(30) Foreign Application Priority Data

Nov. 10, 2017    (KR) .................. 10-2017-0149905

(51) Int. Cl.
*G06F 3/16* (2006.01)
*G06F 16/51* (2019.01)
*G06F 16/54* (2019.01)

(52) U.S. Cl.
CPC .............. *G06F 3/167* (2013.01); *G06F 16/51* (2019.01); *G06F 16/54* (2019.01)

(58) Field of Classification Search
CPC .......... G06F 3/167; G06F 16/51; G06F 16/54
See application file for complete search history.

(56) References Cited

U.S. PATENT DOCUMENTS

| 7,721,301 | B2 | 5/2010 | Wong et al. |
| 2008/0162472 | A1 | 7/2008 | Cheng et al. |
| 2010/0280829 | A1 | 11/2010 | Gopi et al. |
| 2012/0313849 | A1* | 12/2012 | Bak ........................ G06F 3/167 345/156 |
| 2013/0024197 | A1* | 1/2013 | Jang ................... H04N 21/4345 704/246 |
| 2013/0089243 | A1 | 4/2013 | Sauve et al. |

(Continued)

FOREIGN PATENT DOCUMENTS

| EP | 2 533 242 | 12/2012 |
| EP | 2 899 719 | 7/2015 |
| WO | 2014/004536 | 1/2014 |

OTHER PUBLICATIONS

Search Report and Written Opinion dated Feb. 27, 2019 in counterpart International Patent Application No. PCT/KR2018/013400.

(Continued)

*Primary Examiner* — Roland J Casillas
(74) *Attorney, Agent, or Firm* — Nixon & Vanderhye P.C.

(57) ABSTRACT

Disclosed are a display apparatus comprising: a display; a user input receiver comprising receiving circuitry configured to receive a voice input uttered by a user; and a processor configured to: display at least one first image and text information on a display, the text information being related to a second image which is not displayed on the display, and display the second image on the display based on the voice input corresponding to the text information uttered by the user.

23 Claims, 20 Drawing Sheets

(56) References Cited

U.S. PATENT DOCUMENTS

2013/0332168 A1* 12/2013 Kim .................. G10L 15/22
                                                    704/251
2015/0189362 A1* 7/2015 Lee ................. H04N 21/4828
                                                     725/38

OTHER PUBLICATIONS

Extended Search Report dated Mar. 18, 2019 in counterpart European Patent Application No. 18205394.2.
Communication pursuant to Article 94(3) EPC dated Apr. 23, 2019 in counterpart European Patent Application No. 18205394.2.
Tuts+ Computer Skills: "How to Use Smart Folders in OS X." Jan. 18, 2013, pp. 1-2, retrieved from the Internet Apr. 20, 2020, URL:https://www.youtube.comiwatch?v_QVqV5b6s488.
European Office Action dated May 27, 2021 for EP Application No. 18205394.2.

* cited by examiner

DISPLAY APPARATUS AND CONTROL METHOD THEREOF

CROSS-REFERENCE TO RELATED APPLICATION

The application is based on and claims priority under 35 U.S.C. § 119 to Korean Patent Application No. 10-2017-0149905 filed on Nov. 10, 2017 in the Korean Intellectual Property Office, the disclosure of which is incorporated by reference herein in its entirety.

BACKGROUND

Field

The present disclosure relates generally to a display apparatus and a control method thereof, and for example, to a display apparatus and a control method thereof, in which a voice input is used to provide an image view function.

Description of Related Art

Viewing a photograph or the like image content is one of major uses for a display apparatus.

As examples of a user interface mainly used in an image view service, there are a touch input type for a portable display apparatus, and a remote-control input type for a large-screen display apparatus. With recent development of voice recognition technology, use of a voice input interface has been also increased regardless of a screen size of the display apparatus.

However, when the voice input interface is used in the image view service, a voice input is actually possible only for relatively simple and restricted operation such as a next view or the like. Even so, when the possible voice input has an unrestricted range or a drastically broadened range, it is difficult for a user to know what voice input to make.

SUMMARY

An aspect of one or more example embodiments provides a display apparatus which provides more various and convenient interfaces to a user who uses an image view service through a voice input.

A display apparatus according to an example embodiment of the present disclosure includes: a display; a user input receiver comprising receiving circuitry configured to receive a voice input uttered by a user; and a processor configured to: display at least one first image and text information on the display, the text information being related to a second image which is not displayed on the display, and display the second image on the display based on the voice input corresponding to the text information uttered by the user.

The processor may be configured to display text information relating to at least one first image among a plurality of first images on the display, and to display a new image corresponding to the text information relating to the first image on the display based on the voice input corresponding to the text information about the first image uttered by the user.

The processor may be configured to display a new image corresponding to the user's voice input on the display in different ways based on whether the voice input uttered by the user corresponds to the text information relating to the first image or the text information relating to the second image.

The display apparatus may further comprise a sensor, wherein the processor is configured to sense a user or surrounding environments of the display apparatus via the sensor, and to identify the text information based on information of the sensed user and/or the sensed surrounding environments of the display apparatus.

The processor may be configured to identify text information relating to the second image to belong to a different category from the text information relating to the first image and/or the voice input previously uttered by the user, based on the user input when the receiver receives no inputs for a predetermined period of time or based on the voice input corresponding to the text information relating to the second image being input.

The display apparatus may further comprise a communicator comprising communication circuitry, wherein the text information relates to a second image stored in an external apparatus, and the processor is configured to receive the second image from the external apparatus via the communicator and to display the second image on the display based on the voice input corresponding to the text information being uttered by the user.

The processor may be configured to set text information corresponding to a predetermined image based on a usage history of a social network service (SNS) application and/or a history of voice input.

The processor may be configured to display the text information relating to the first image and the text information relating to the second image distinguishably from each other.

The processor may be configured to apply graphic effects to the displayed text information based on whether the voice input uttered by the user corresponds to the text information.

The processor may be configured to display a correlation between the displayed image and corresponding text information.

The voice input may comprise a plurality of words, and the processor is configured to display second images corresponding to each word of the plurality of words on the display in sequence.

A method of controlling a display apparatus according to an example embodiment of the present disclosure includes displaying at least one first image and text information on a display, the text information being related to a second image which is not displayed on a display; and displaying the second image on the display based on a voice input corresponding to the text information being uttered by a user.

The method may further comprise displaying text information relating to at least one first image among the plurality of first images on the display; and displaying a new image corresponding to the text information relating to the first image on the display based on the voice input corresponding to the text information about the first information being uttered by the user.

The method may further comprise displaying a new image corresponding to the user's voice input on the display in different ways based on whether the voice input uttered by the user corresponds to the text information relating to the first image or the text information relating to the second image.

The method may further comprise sensing a user or surrounding environments of the display apparatus, and identifying the text information based on information of the sensed user and/or the sensed surrounding environments of the display apparatus.

The method may further comprise identifying the text information relating to the second image to belong to a different category from the text information relating to the first image or the voice input previously uttered by the user, based on a user input when the receiver receives no inputs for a predetermined period of time or based on the voice input corresponding to the text information relating to the second image being input.

The text information may relate to a second image stored in an external apparatus, and the method further comprises receiving the second image from the external apparatus and displaying the second image on the display based on the voice input corresponding to the text information being uttered by the user.

The method may further comprise setting text information corresponding to a predetermined image based on a usage history of a social network service (SNS) application and/or a history of voice input.

The method may further comprise displaying the text information relating to the first image and the text information relating the second image distinguishably from each other.

The method may further comprise applying graphic effects to the displayed text information based on whether the voice input uttered by the user corresponds to the text information.

The method may further comprise displaying a correlation between the displayed image and corresponding text information.

The voice input may comprise a plurality of words, and the method further comprises displaying second images corresponding to each word of the plurality of words on the display in sequence.

A computer program according to an example embodiment of the present disclosure includes a computer program combined with the display apparatus and stored in a non-transitory computer-readable recording medium to achieve the method.

The computer program may be stored in a medium in a server and downloaded in the display apparatus through a network.

BRIEF DESCRIPTION OF THE DRAWINGS

The above and/or the aspects, features and attendant advantages of the present disclosure will become apparent and more readily appreciated from the following detailed description, taken in conjunction with the accompanying drawings, in which like reference numerals refer to like elements, and wherein.

DETAILED DESCRIPTION

Figure 1:
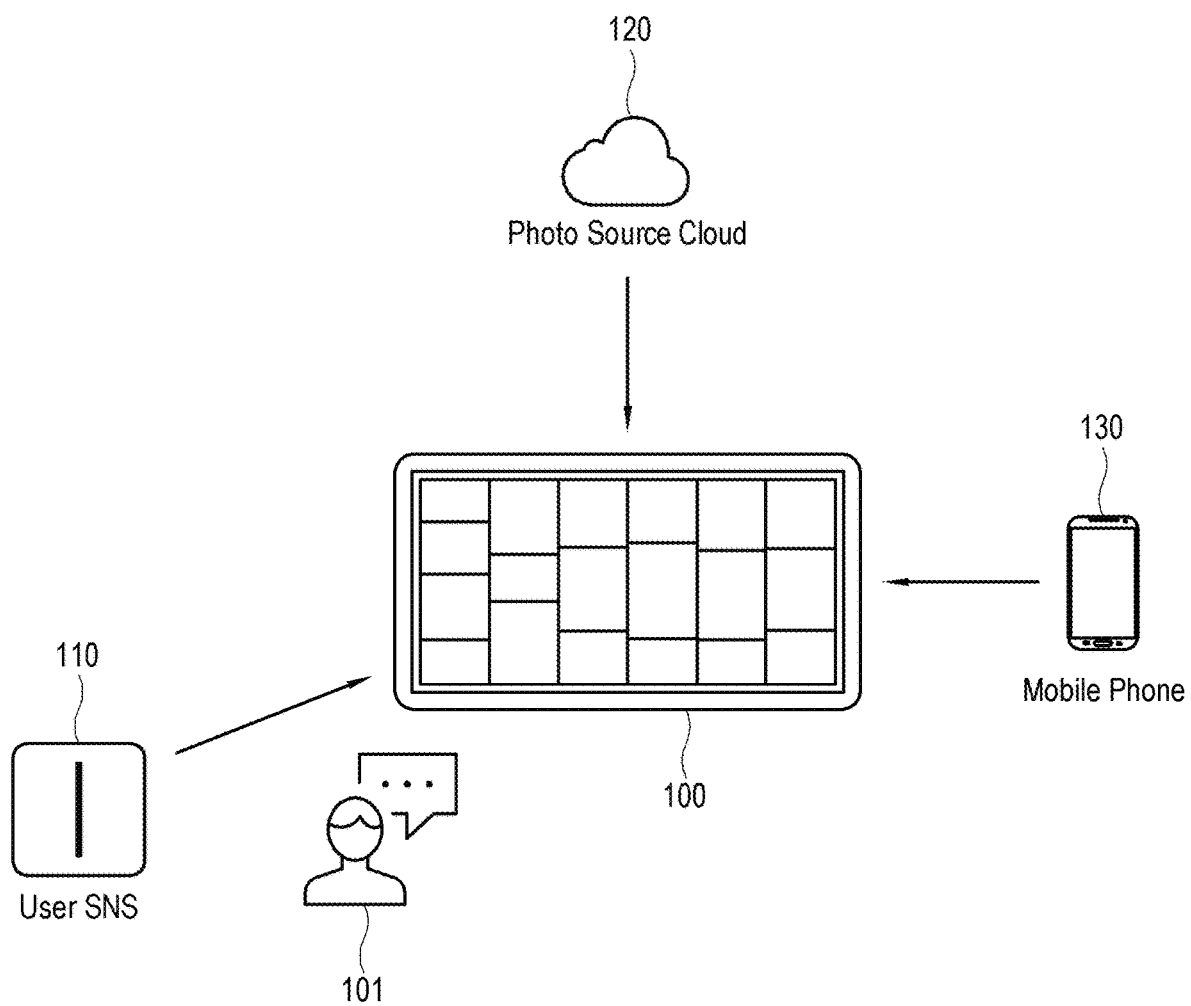
FIG. 1 is a diagram illustrating a display apparatus according to an example embodiment of the present disclosure.

Below, example embodiments will be described in detail with reference to accompanying drawings. In the drawings, like numerals or symbols refer to like elements having substantially the same function, and the size of each element may be exaggerated for clarity and convenience of description. However, the structures and functions illustrated in the following example embodiments do not limit the present disclosure and the key structures and functions. In the following descriptions, details about publicly known functions or features will be omitted if it is determined that they cloud the gist of the present disclosure.

In the following example embodiments, terms 'first', 'second', etc. are only used to distinguish one element from another, and singular forms are intended to include plural forms unless otherwise mentioned contextually. In the following example embodiments, it will be understood that terms 'comprise', 'include', 'have', etc. do not preclude the presence or addition of one or more other features, numbers, steps, operations, elements, components or combination thereof. In addition, a 'module' or a 'portion' may perform at least one function or operation, be achieved by hardware, software or any combination of hardware and software, and be modularized into at least one processor.

FIG. 1 is a diagram illustrating a display apparatus according to an example embodiment of the present disclosure. The display apparatus 100 according to an example embodiment of the present disclosure may be for example, and without limitation, realized by a television (TV). According to an alternative embodiment of the present disclosure, the display apparatus 100 may be for example, and without limitation be realized by an electronic frame, a digital billboard, a large format display (LFD), a digital signage, a smartphone, a tablet computer, a mobile phone, a smart watch, a wearable device such as a head-mounted display, a computer, a multimedia player, a set-top box, a refrigerator, or the like capable of outputting image content. However, the display apparatus 100 according to an example embodiment of the present disclosure may include any apparatus capable of displaying an image or content without limitations.

The display apparatus 100 according to an example embodiment of the present disclosure may receive a voice input from a user 101 and may display a corresponding image. Here, the image may for example include a photograph and/or picture file, etc. There are no limits to a compression method or format for an image file. Further, the image of the present disclosure may include some frames of a plurality of images or moving images. In this case, the display apparatus 100 according to an example embodiment of the present disclosure may display not only a still image but also a moving image or content. Hereinafter, the image is intended to include the moving image.

There may be various sources for an image which can be displayed in the display apparatus 100 according to an example embodiment of the present disclosure. For example, the display apparatus 100 according to an example embodiment of the present disclosure may read and display an image stored in an internal storage and/or an external storage, may obtain and display an image by receiving an image from a social network service (SNS) application 110 or directly accessing an SNS server, and may receive and display an image from a cloud server 120 or a mobile phone 130. However, there are no limits to a method and a source by and from which the display apparatus 100 receives an image.

Figure 2:
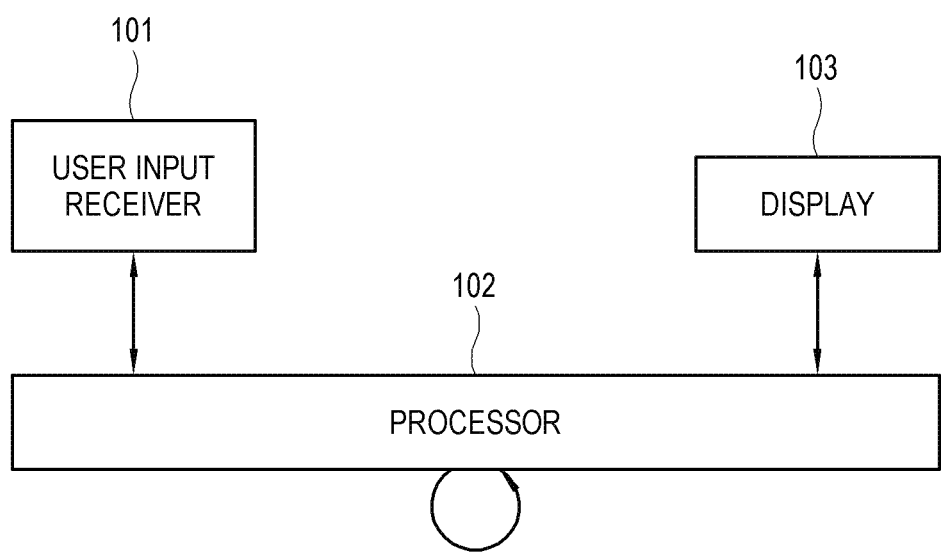
FIG. 2 is a block diagram illustrating a configuration of a display apparatus according to an example embodiment of the present disclosure.

FIG. 2 is a diagram illustrating an example configuration of a display apparatus according to an example embodiment of the present disclosure. The display apparatus 100 according to an example embodiment of the present disclosure includes a user input section (e.g., including user input receiving circuitry) 101, a processor (e.g., including processing circuitry) 102, and a display 103. However, the configuration of the display apparatus 100 illustrated in FIG. 2 is merely an example, and the display apparatus according to an example embodiment of the present disclosure may be realized by various alternative elements. In other words, the display apparatus according to an example embodiment of the present disclosure may include other elements in addition to the configuration illustrated in FIG. 2 or exclude some elements from the configuration illustrated in FIG. 2.

The user input section 101 may include various receiving circuitry and receive a voice input uttered by a user and transmit a corresponding voice signal to the processor 102. The user input section 101 may be for example, and without limitation, be realized by a microphone. The user input section 101 may autonomously perform a signal process on the received voice signal.

The user input section 101 may receive a user's touch input and/or a user's remote input using a remote controller, and transmit the user input to the processor 102. In the following embodiments, it will be described for convenience of description that the user input is made in the form of the voice input. However, the user input does not preclude other input types such as the touch input, the remote input, etc., and may be made in a different form from the voice input when the touch input, the remote input, etc. are possible.

The processor 102 may include various processing circuitry and process a voice signal received in the user input section 101. For example, the processor 102 may perform processes such as volume control, amplification, etc. on the voice signal. The processor 102 may, for example, and without limitation be realized by one or more hardware (e.g., including circuitry and/or software modules (e.g., including program elements) or any combination thereof to perform the foregoing processes.

The processor 102 may process an image read from a storage or received from the application 110, the cloud server 120 or the mobile phone 130. There are no limits to the kinds of image processes or image processing processes performed by the processor 102. The image process performed by the processor 102 may for example, and without limitation, include demultiplexing for dividing an input stream into sub streams of video, audio and appended data; decoding corresponding to an image format of an image stream; deinterlacing for converting an interlaced type of an image stream into a progressive type; scaling for adjusting an image stream to have a preset resolution; noise reduction for improving image quality; detail enhancement; frame refresh rate conversion; etc.

The processor 102 may perform control for operating general elements of the display apparatus 100. The processor 102 may include a control program (or instruction) for performing such control operations, a nonvolatile memory in which the control program is installed, a volatile memory in which at least a part of the installed control program is loaded, and at least one processor or central processing unit (CPU) for executing the loaded control program. Further, the control program may be stored in an electronic apparatus other than the display apparatus 100.

The control program may include a program(s) achieved in the form of at least one of a basic input/output system (BIOS), a device driver, an operating system, firmware, a platform, and an application program. According to an example embodiment, the application program may be previously installed or stored in the display apparatus 100 when the display apparatus 100 is manufactured, or may be installed in the display apparatus 100 on the basis of application program data received from the outside when used in the future. The application data may be for example downloaded from an application market and the like external server to the display apparatus 100, but not limited thereto. Meanwhile, the processor 102 may, for example, and without limitation, be realized in the form of a device, an S/W module, a circuit, a chip, and/or any combination thereof.

The processor 102 may for example control the user input section 101 to receive a user input. After processing an image, the processor 102 may also control the display 103 to display the processed image. In the display apparatus 100 illustrated in FIG. 2, both the process and control are performed in one processor 102. However, this is merely an example, and a display apparatus according to an alternative embodiment of the present disclosure may include a separate controller in addition to the processor.

The display 103 may display an image processed by the processor 102. The display 103 may be for example, and without limitation be realized by various display types such as liquid crystal, plasma, a light emitting diode (LED), an organic light emitting diode (OLED), a surface conduction electron emitter, a carbon nano tube, nano crystal, etc. When the type of the display 103 is the liquid crystal, the display 103 may include a liquid crystal display (LCD) panel, a backlight unit for emitting light to the LCD panel, a panel driver for driving the LCD panel, etc. The display 103 may, for example, and without limitation, be realized by a self-emissive OLED panel without the backlight unit.

The display apparatus 100 according to an example embodiment of the present disclosure may further include a storage or a communicator (e.g., including communication circuitry).

The storage may be configured to store various pieces of data in accordance with processes and control of the processor 102. The storage may be accessed by the processor 102 and perform reading, recording, modifying, updating, etc. with regard to the data. The storage may include, for example, and without limitation, a flash memory, a hard disc drive (HDD), a solid-state drive (SSD), and the like non-volatile memory in which data is retained regardless of whether system power is supplied to the display apparatus 100 or not. Further, the storage may include a buffer, a random-access memory (RAM), and the like volatile memory in which data to be processed by the processor 102 is temporarily loaded.

The communicator may include various communication circuitry and communicate with an external module or an external apparatus, for example, the SNS application 110, the cloud server 120, the mobile phone 130, or the like. The communicator may perform wired or wireless communication. Therefore, the communicator may, for example, and without limitation, be realized by various communication ways as well as an accessing portion including a connector or a terminal for a wired connection. For example, the communicator may be configured to perform one or more communications among Wi-Fi, Bluetooth, Zigbee, infrared communication, radio control, ultra-wide band (UWB), wireless universal serial bus (USB), near field communication (NFC), or the like. The communicator may include communication modules for Bluetooth low energy (BLE), serial port profile (SPP), Wi-Fi Direct, infrared communication, Zigbee, NFC, etc. The communicator may, for example, and without limitation, be realized in the form of a device, an S/W module, a circuit, a chip, etc.

Figure 3:
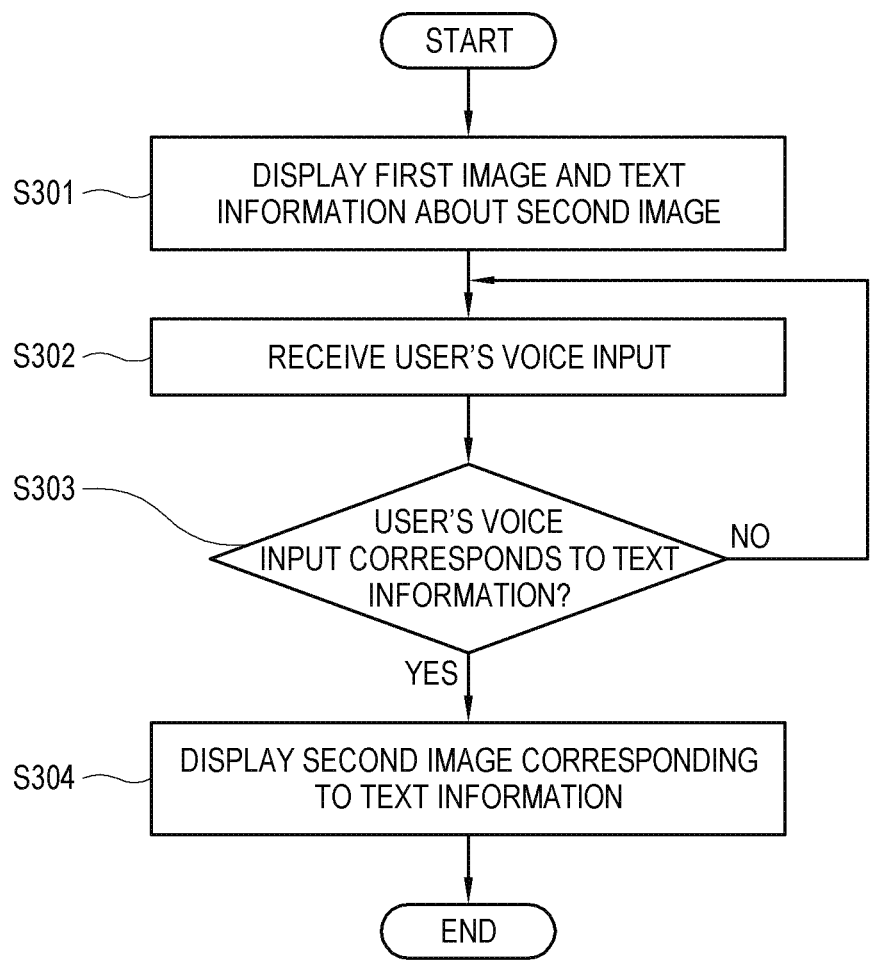
FIG. 3 is a flowchart illustrating a control method of a display apparatus according to an example embodiment of the present disclosure.

FIG. 3 is a flowchart illustrating an example control method of a display apparatus according to an example embodiment of the present disclosure. The processor 102 of the display apparatus 100 according to an example embodiment of the present disclosure displays at least one first image and text information on the display 103, in which the text information is related to a second image being not displayed on the display 103 (S301). Here, the 'text information about an image' refers to any kind of information, which can be represented as a text, among pieces of information about the image. For example, when the image is a photograph, the text information about the photograph may include a capture date, a capture location, a capture device, a capture lens, exposure, sensitivity information, a view angle, etc. Further, the text information about an image may include information about the image itself, for example, tag information. Besides, the text information may also include all kinds of attribute information and metadata of describing the image. For example, the text information about the image may include information about a person or object and a background included in the image; the type, kind, situation and category (e.g. a document, a nature, sports, a travel, a meeting, a conference, a group picture, etc.) of corresponding content, etc.

The processor 102 receives a user's voice input (S302), determines whether the received voice input corresponds to the text information (S303). When the voice input corresponds to the text information, the display 103 displays a second image corresponding to the input text information (S304). For example, when a user's voice input corresponds to not the first image displayed on the display 103 but the text information about the second image not displayed on the display 103, the processor 102 displays the second image on the display 103, so that the user can input a voice command by referring to the text information displayed on the screen, thereby viewing a new image which has not been displayed yet on the screen of the display 103.

Thus, the display apparatus 100 according to an example embodiment of the present disclosure displays the text information, which relates to the second image not displayed on the screen, to the screen while the first image is displayed on the screen, thereby inducing a user to utter a voice. Accordingly, a user can immediately input a voice command for reconfigure an image on the screen, and easily issue the voice command by referring to the text information displayed on the screen.

Figure 4:
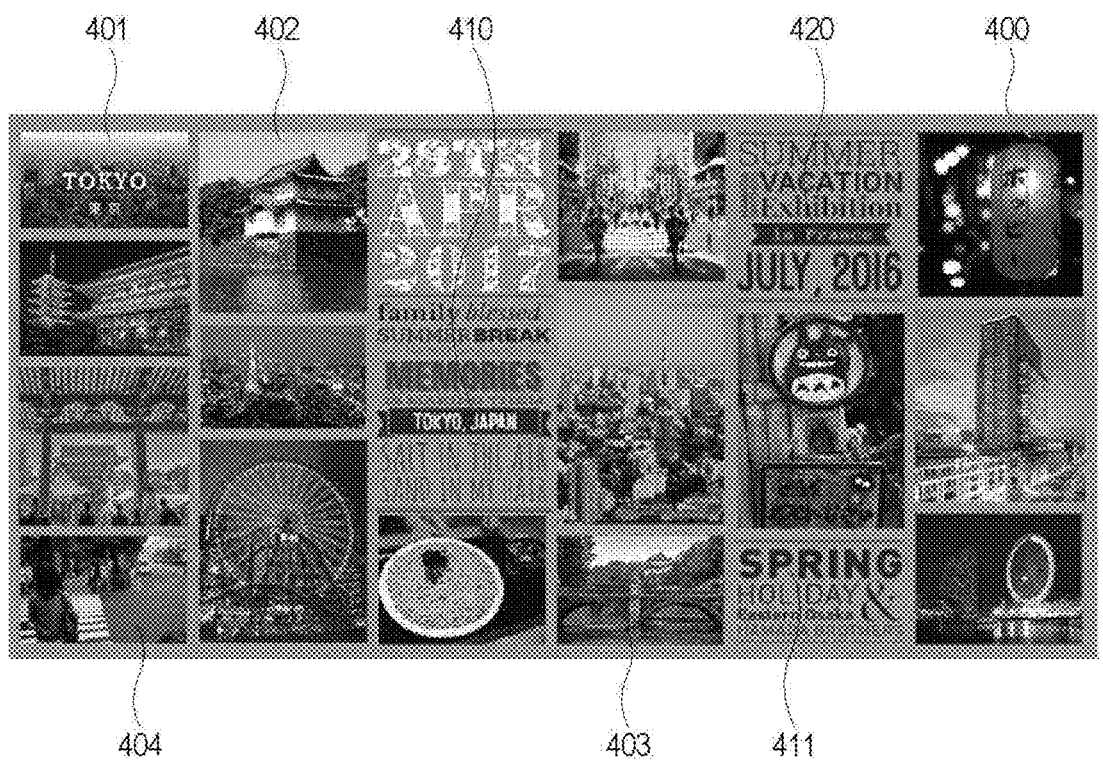
FIGS. 4 and 5 are diagrams illustrating an example of a screen displayed in a display apparatus according to an example embodiment of the present disclosure.
Figure 5:
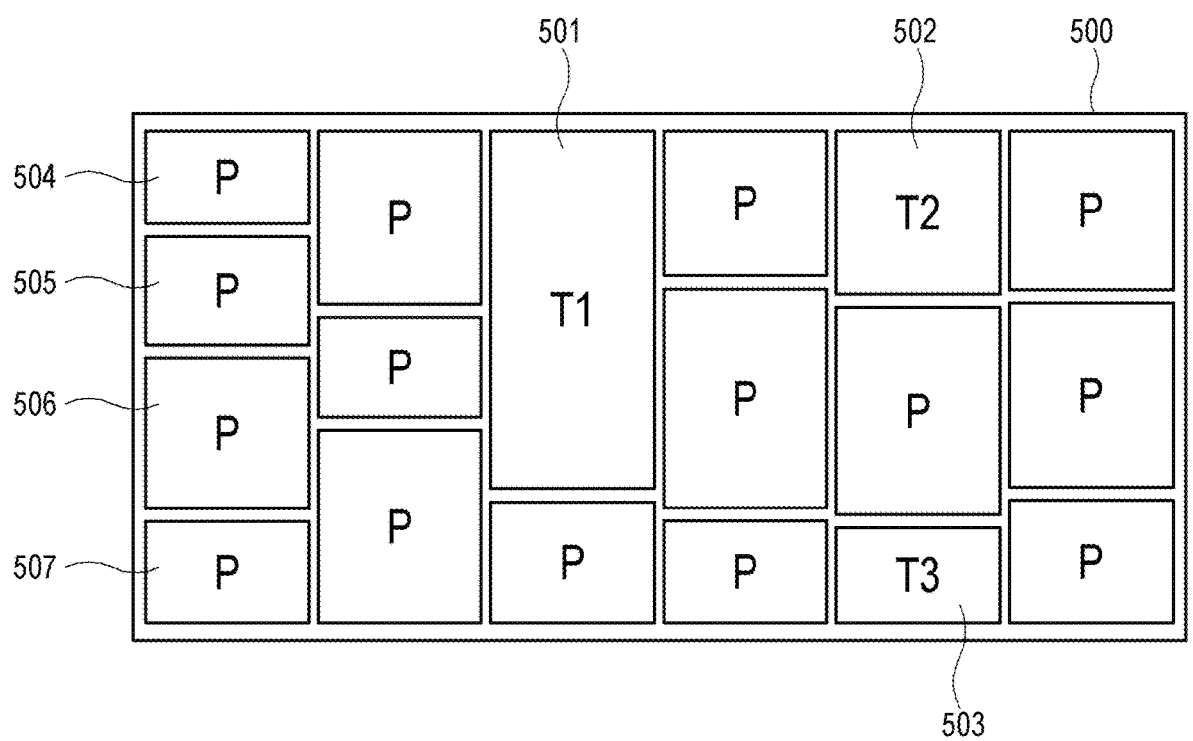

FIGS. 4 and 5 are diagrams illustrating an example of a screen displayed in a display apparatus according to an example embodiment of the present disclosure. As illustrated in FIG. 4, the processor 102 of the display apparatus 100 according to an example embodiment of the present disclosure displays both the image and the text information on the screen of the display 103 (400). In other words, the screen 500 of the display 103 may be divided into image display areas 504, 505, 506, 507 and text information display areas 501, 502, 503 as illustrated in FIG. 5. However, the image and the text information illustrated in FIG. 4 and FIG. 5 are merely an example, and there are no limits to the configuration and arrangement between the image and the text information, the size and shape of each detailed area, and the number of areas.

Thus, when a user's voice input corresponding to the text information is received while both the first image and the text information about the second image different from the first image are displayed on the screen of the display 103, the processor 102 displays the second image corresponding to the text information uttered by the user on the display 103. Here, there may be various methods of displaying the second image on the display 103. For example, the processor 102 may display the second image on the display 103 by replacing at least a part of the first image already displayed on the display 103 with the second image. The processor 102 may display the second image on an empty space of the display 103 when the display 103 has an empty space on the screen. The processor 102 may secure an empty space on the screen of the display 103 by reducing the size, rearranging, and/or etc. with regard to at least a part of the already displayed first image, and then display the second image on the secured space, thereby newly displaying the second image on the display 103 while entirely maintaining the already displayed first image on the screen even when the first image was displayed without any empty space. For example, the processor 102 reduces the sizes of the already displayed first images and then moves the positions of the resized first images to edge portions of the display 103, thereby securing a space in a center portion of the display 103 and newly displaying the second image.

Figure 6:
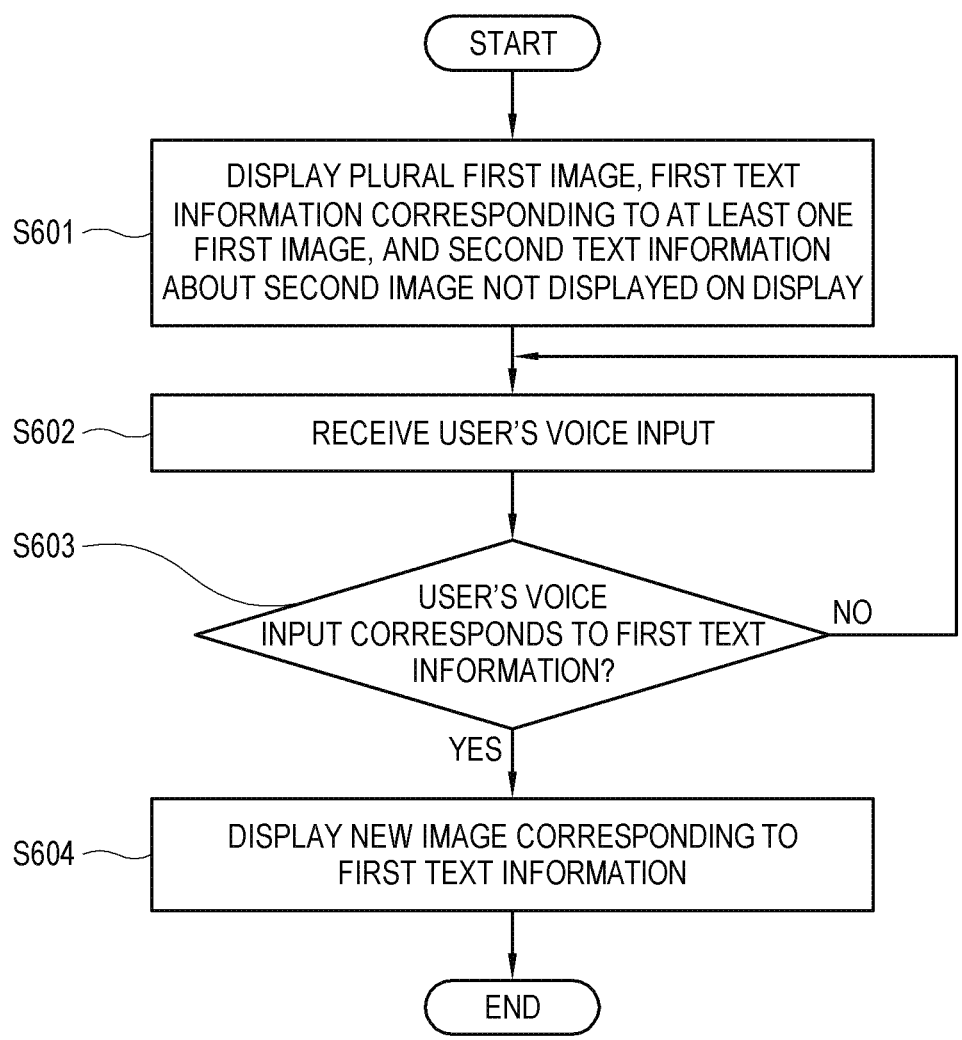
FIG. 6 is a flowchart illustrating a control method of a display apparatus according to an example embodiment of the present disclosure.

FIG. 6 is a flowchart illustrating an example control method of a display apparatus according to another example embodiment of the present disclosure. The processor 102 of the display apparatus 100 according to another example embodiment makes the screen of the display 103 display not only the text information (hereinafter, referred to as 'second text information') about the second image different from the first image displayed on the screen but also text information (hereinafter, referred to as 'first text information) about the first image already displayed on the screen (S601). When the first image which is displayed on the display comprises a plurality of images, the first text information may correspond to either a part of the first image or a whole of the first image. In addition, when the first image which is displayed on the display comprises a plurality of images (hereinafter, also referred to as '1-1 image' and '1-2 image'), the first text information may also comprise a plurality of text information (hereinafter, also referred to as '1-1 text information' and '1-2 text information'). In this case, each of the first text information may correspond to at least a part of the first image which is displayed on the display. For example, the 1-1 text information may correspond to the 1-1 image and the 1-2 text information may correspond to the 1-2 image.

Then, the processor 102 receives a user's voice input (S602), determines whether the user's voice input corresponds to the first text information (as well as the second text information) (S603), and displays a new image corresponding to the first text information when the user's voice input corresponds to the first text information (S604).

Referring back to FIG. 4, this example embodiment will be described in greater detail. On the screen 400 of the display 103 illustrated in FIG. 4, photographs 401 and 402 about Tokyo and photographs 403 and 404 about Spring are displayed as the first images, and text information 420 about a second image different from the first image, for example, an image about Paris are displayed. In addition, text information 410 and 411 about the first image is also displayed. When a user's voice input uttered in this state corresponds to one of the text information 410 and 411 of the first image, e.g., when a user's voice corresponding to the text information 410 about Tokyo is input while the photographs 401 and 402 about Tokyo have been already displayed on the screen as illustrated in FIG. 4, the processor 102 displays a new photograph about Tokyo on the screen 400 of the display 103. When a user's voice corresponding to another text information of the first image which is displayed on the display, e.g., text information 411 about Spring is input, the processor 102 displays a new photograph about Spring on the screen 400 of the display 103. When a user's voice corresponding to the text information of the second image which is not displayed on the display, e.g., text information 420 about Paris is input, the processor 102 displays a new photograph about Paris on the screen 400 of the display 103.

Thus, it is convenient for a user to various change the image displayed on the screen of the display through the voice input. For example, by referring to the text information displayed on the screen while viewing the first image displayed on the screen, a user inputs a voice command about the text information about the first image when the user wants to view more images related to the first image being currently displayed on the screen, and inputs a voice command about the text information about the second image when the user wants to view an image different from the first image being currently displayed on the screen, thereby easily and variously changing the image displayed on the screen of the display through the voice input.

Further, the processor 102 of the display apparatus 100 according to another example embodiment of the present disclosure may display a new image corresponding to a voice input uttered by a user on the display 103 in different ways according to whether the user's voice input corresponds to the text information about the first image or the text information about the second image.

As described above, when both the first text information and the second text information are displayed on the screen of the display 103, there is a difference between functions provided by the display apparatus 100 in accordance with inputs corresponding to the text information. That is, when the voice command is input corresponding to the first text information, the processor 102 of the display apparatus 100 newly displays an image related to the first image being currently displayed on the screen. On the other hand, when the voice command is input corresponding to the second text information, the processor 102 displays an image different from the first image being currently displayed on the screen. Therefore, it may be effective that the newly displayed images are displayed in different ways according to the cases.

For example, when the voice command is issued corresponding to the first text information, the processor 102 reduces the sizes of the already displayed first images and secures a space in a center portion of the display 103 by moving the positions of the resized first images to edge portions of the display 103, thereby additionally displaying a new image about the first text information on the secured space on the screen. On the other hand, when the voice command is issued corresponding to the second text information, the processor 102 displays the second image on the display 103 by replacing at least a part of the already displayed first image with the second image about the second text information. That is, the processor 102 displays a new image in addition to the already displayed image when the voice command is issued corresponding to the first text information, and replaces the already displayed image with a new image when the voice command is issued corresponding to the second text information. Accordingly, it is possible to intuitively show that an image related to the already displayed image is newly displayed when the voice command is input with regard to the first text information, and a new image for replacing the already displayed image is newly displayed when the voice command is input with regard to the second text information.

Thus, graphical effects are intuitively given to a user in response to a user's voice input corresponding to the first text information or the second text information.

When a user makes a voice input, a voice may be uttered corresponding to both the first text information and the second text information. This will be described in greater detail below with reference to FIG. 7.

Figure 7:
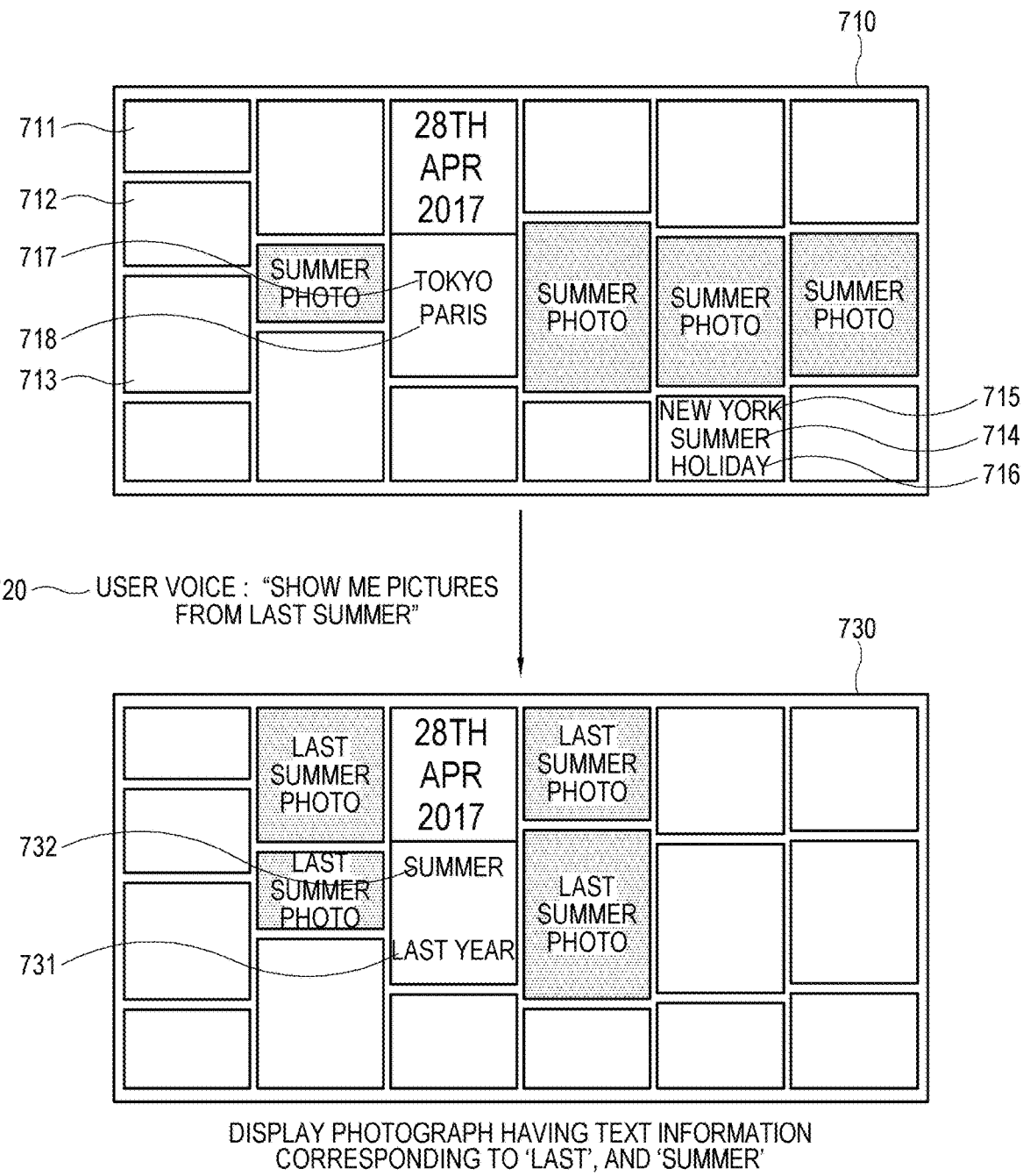
FIG. 7 is a diagram illustrating an example of operations in a display apparatus according to an example embodiment of the present disclosure.

'710' of FIG. 7 illustrates an example of the screen of the display 103, which is displayed at a moment when a user makes a voice input. On the screen, a plurality of first images 711, 712, 713, first text information 714, 715, 716 about the plurality of first images 711, 712, 713, and second text information 717 and 718 about an image not displayed on the screen are displayed. For example, on the screen, 'SUMMER', 'HOLIDAY', AND 'NEW YORK' are displayed as the first text information 714, 715, 716; a plurality of photographs about 'New York' are displayed as the first images 711, 712, 713; and 'TOKYO', 'PARIS', etc. are displayed as the second text information 717 and 718.

However, there are no limits to the arrangement positions and pattern of the first image, the first text information, and the second text information.

While such a screen is being displayed, when a user utters a voice of "show me pictures from last summer" (720), the processor 102 of the display apparatus 100 according to an example embodiment of the present disclosure receives and analyzes the voice uttered by the user, and determines that the uttered voice corresponds to both the first text information and the second text information. This determination is based on that "summer" in the voice corresponds to the first text information, e.g., 'SUMMER', and "last" in the voice can be regarded as text information related to an image not displayed yet on the screen and thus treated like the second text information even though it does not correspond to the second text information displayed on the screen.

As above, when it is determined that the voice uttered by the user is related to both the first text information and the second text information, the processor 102 makes an image corresponding to the input first and second text information on the screen (730). As a method of displaying the image corresponding to the input first and second text information on the screen, there may be various methods as described above. However, when a voice corresponding to the first text information and the second text information is input, it may be determined as an input for requesting more images related to the already displayed image as long as the first text information is input, and it is therefore suitable that the processor 102 employs the same method as the method of displaying the image corresponding to the first text information.

Further, the processor 102 may make the first text information be changed or updated corresponding to the newly displayed image. For example, as an image corresponding to not only 'SUMMER' but also 'LAST' is newly displayed on the screen, the text information of 'LAST' does not correspond to the first text information before a user's voice input but corresponds to the first text information after the user's voice input, thereby updating the text information corresponding to 'LAST' the text information into the first text information (731). After the new image is displayed, the first text information, which has already been displayed on the screen, may be displayed at a changed position (732). Further, the processor 102 may also change or update the second text information after displaying an image corresponding to a user's voice input on the screen. The change or update for the second text information will be described in greater detail with reference to FIG. 9.

The content, configuration and arrangement, shape, etc. of the text information to be displayed on the screen may be varied depending on various example embodiments of the present disclosure. One example of the embodiments will be described in greater detail below with reference to FIG. 8.

Figure 8:
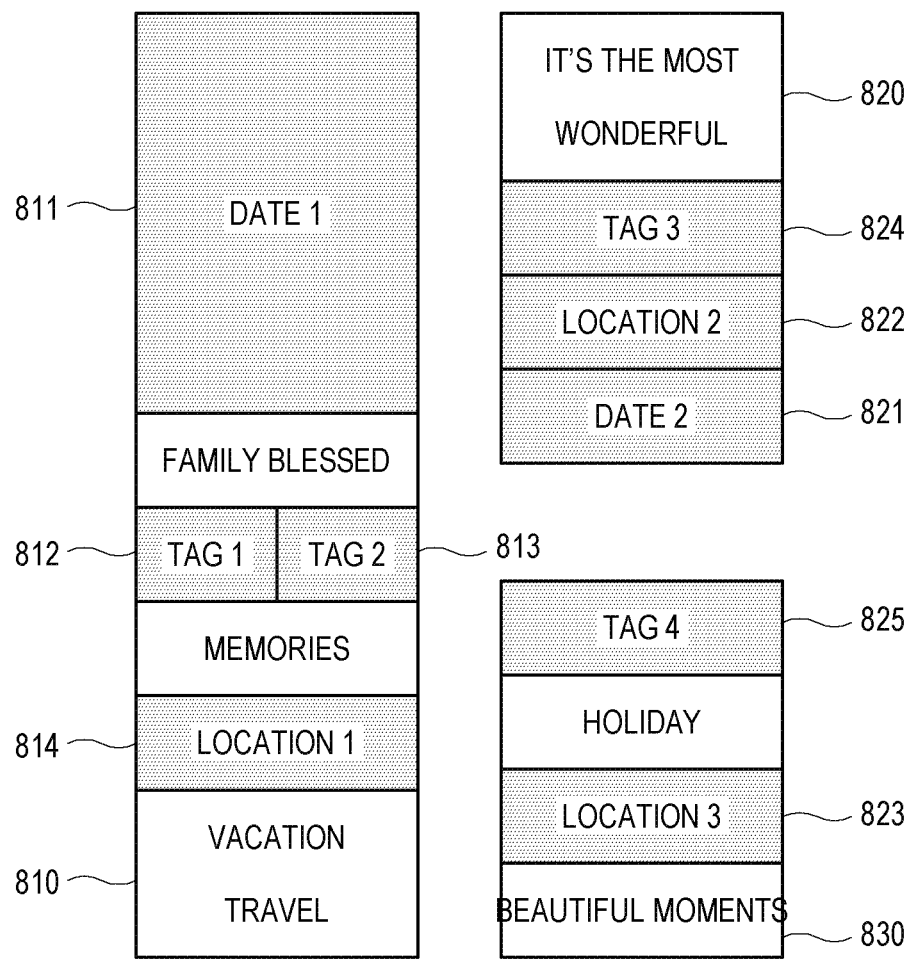
FIG. 8 is a diagram illustrating an example of a text information display part in a display apparatus according to an example embodiment of the present disclosure.

FIG. 8 is a diagram illustrating an example of a text information display part when the text information is displayed throughout three areas on the screen of the display 103. However, there are no limits to the number of areas on which the text information will be displayed. Of course, there are no needs of gathering and displaying the text information on some areas as shown in FIG. 8.

FIG. 8 illustrates an example that the text information to be displayed is broadly sorted according to three types such as a date, a location and a tag. However, there are no limits to the content and classifying types of the text information.

Referring to FIG. 8, a first area 810 among three areas is an area related to the text information about the first image being currently displayed on the screen of the display 103, and a second area 820 and a third area 830 are areas related to the second image which has not been displayed yet on the screen of the display 103. In this case, a user may use the text information on the first area 810 when the user wants to view more images related to the currently displayed first image. On the other hand, when the user wants to view an image different from the first image being currently displayed on the screen, the different image may be displayed by referring to the second area 820 and the third area 830 (hereinafter, referred to as 'filtering').

The first area 810 is a text information display area related to the currently displayed first image, and 'DATE 1' 811 in the first area 810 shows the current date. 'TAG 1' 812 and 'TAG 2' 813 show the tag information related to the currently displayed image. 'LOCATION 1' 814 displays location information related to the currently displayed image. There may be various methods of selecting or determining the tag or location information related to the currently displayed image. For example, tag or location information related to the most images among the currently displayed images may be displayed, or tag or location information related to the most recently displayed image may be displayed.

The second area 820 and the third area 830 are text information display areas related to the second image not displayed on the screen, in which 'DATE 2' 821 shows date information recommended for filtering, 'LOCATION 2' 822 and 'LOCATION 3' 823 show location information recommended for filtering, and 'TAG 3' 824 and 'TAG 4' 825 show tag information recommended for filtering.

Figure 9:
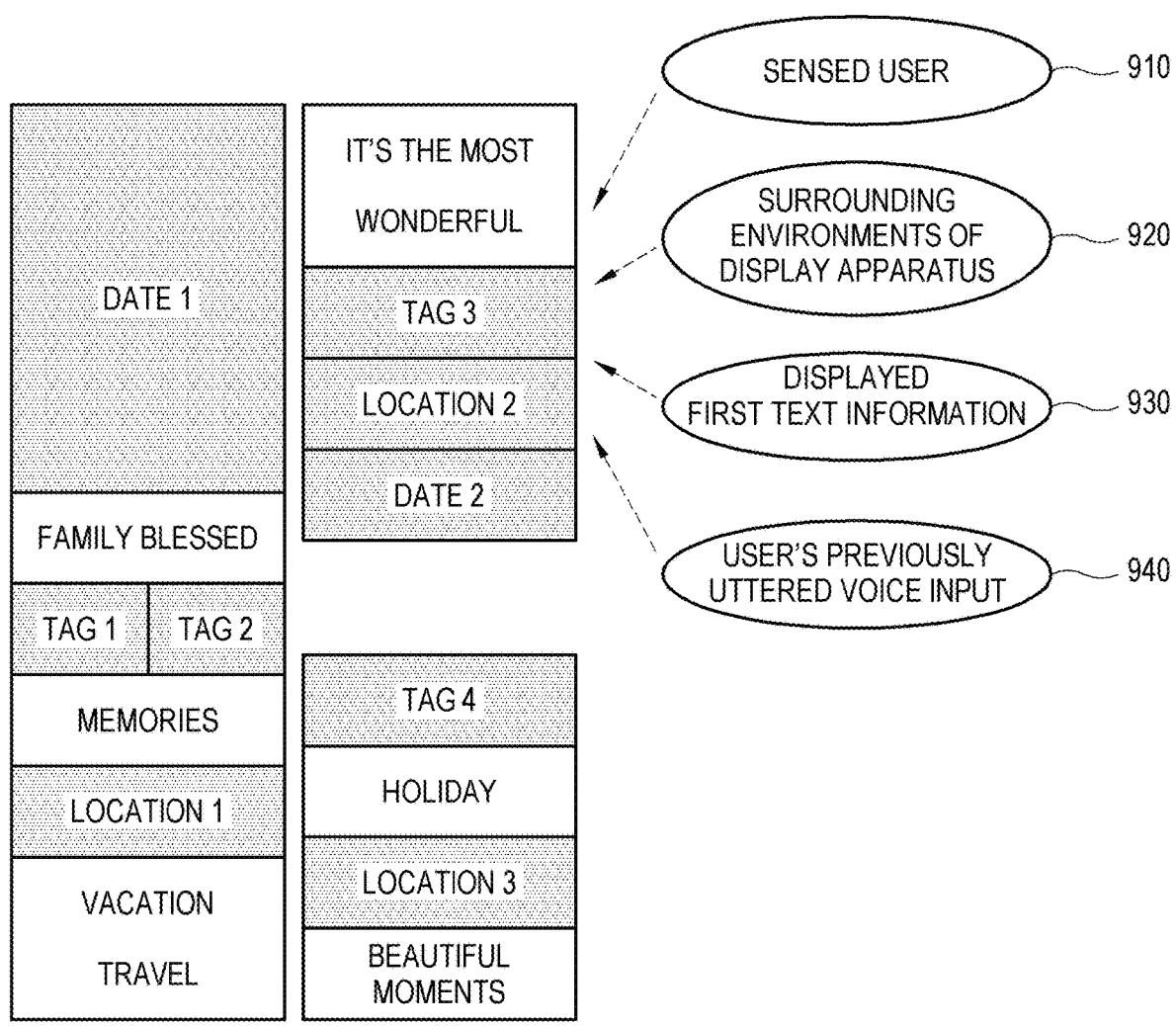
FIG. 9 is a diagram illustrating an example of reference information when text information is determined in the display apparatus according to an example embodiment of the present disclosure.

A method of determining the text information to be recommended for the filtering will be described with reference to FIG. 9. The processor 102 of the display apparatus 100 according to an example embodiment of the present disclosure may determine the text information to be recommended for the filtering, by referring to information about a sensed user 910, information about the surrounding environments 920 of the display apparatus 100, already displayed first text information 930, information about a user's previously uttered voice input 940, etc. However, there are no limits to the information to be referred when the processor 102 determines the text information to be recommended for the filtering.

First, the display apparatus 100 according to an example embodiment of the present disclosure further includes a sensor to sense a user who uses the display apparatus 100 or sense the surrounding environments of the display apparatus 100. The processor 102 may determine the text information to be recommended for the filtering based on the user or the surrounding environments of the display apparatus 100 sensed by the sensor. For example, when a user who is currently using the display apparatus 100 is sensed by the sensor, the processor 102 recognizes who is the user and then determines the text information suitable for the recognized user by referring to an utterance history of the user or the like method. When the current surrounding environments of the display apparatus 100 is sensed by the sensor, the processor 102 may determine the text information suitable for the surrounding environments as the text information to be recommended for the filtering. For example, when the current time is determined as evening time or night time from results of sensing the surrounding environments of the display apparatus 100, the processor 102 may determine a night scene or the like as the text information. However, there are no limits to the sensible surrounding environments and the corresponding text information. For example, the lighting, temperature, season, general color, surrounding things, etc. around the display apparatus 100 may be also sensed to determine the text information.

Thus, it is possible to provide the text information more suitable for a user's situation.

Further, the display apparatus 100 according to an example embodiment of the present disclosure may determine the text information to be recommended for the filtering, by referring to the already displayed first text information 930, and the user's previously uttered voice input information 940. For example, the processor 102 of the display apparatus 100 may determine the text information about the second image to belong to a different category from the text information about the first image or the user's previously uttered voice input. For example, the processor 102 may provide text information about an image that belongs to a category different from that of the already displayed image, or provide text information about an image that belongs to a category different from that requested by the voice input that a user has already made. Thus, a user can use an image view service by receiving and referring to text information about an image different from an already displayed or searched image, and thus easily view various photographs with even fewer inputs.

As above, a point in time for determining and displaying the text information to be recommended for the filtering may include various points in time. For example, the processor 102 may determine the text information to be recommended for the filtering and use the determined text information for updating the second text information when the second text information is updated after displaying a new image in response to a user's voice input. The processor 102 may determine the text information to be recommended for the filtering and update the second text information based on the determined text information even when a user makes no voice input for a predetermined period of time.

Figure 10:
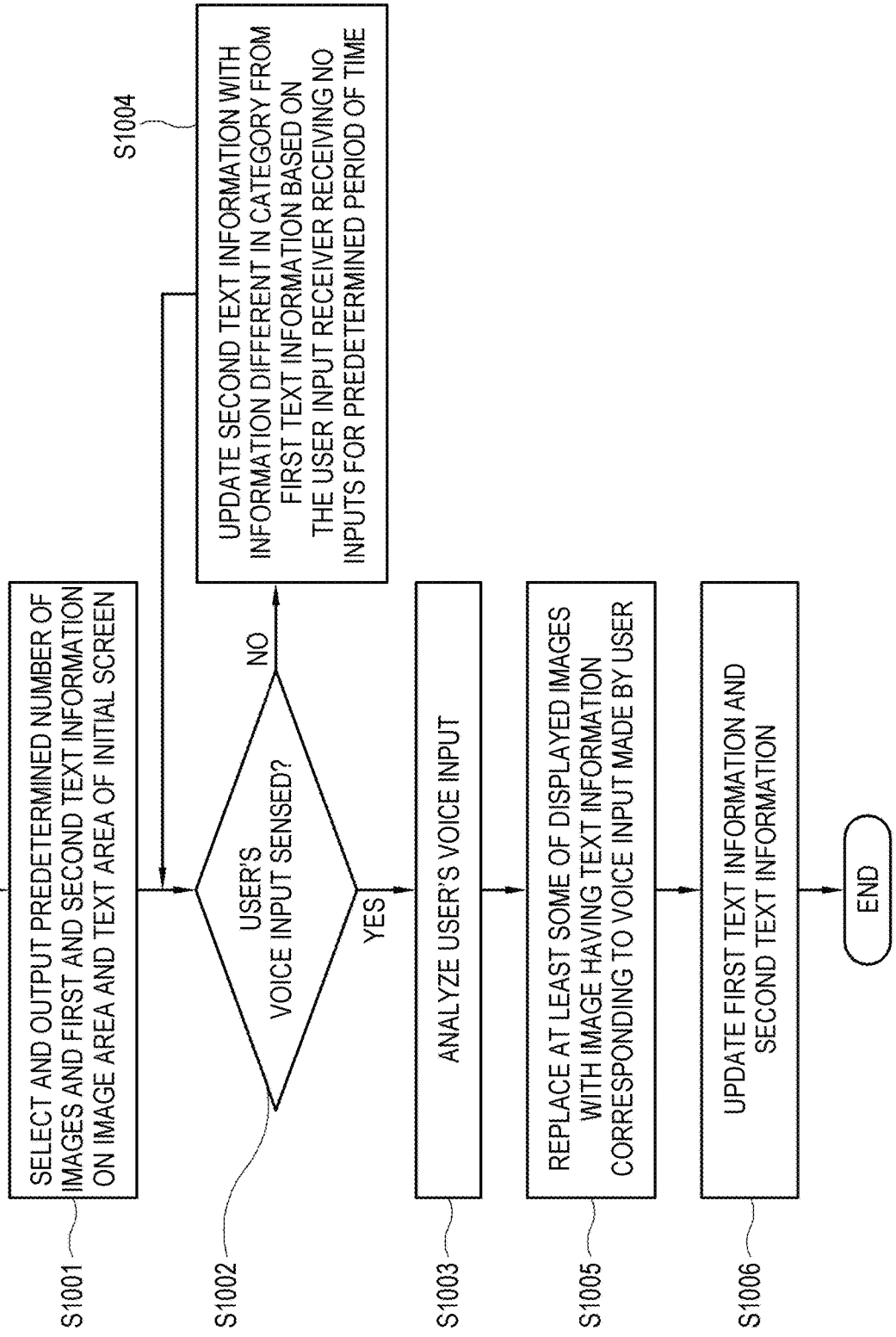
FIG. 10 is a flowchart illustrating an example of operations of the display apparatus according to an example embodiment of the present disclosure.

Details of the display apparatus according to an example embodiment where the foregoing examples are combined will be described in greater detail below with reference to FIG. 10.

The processor 102 of the display apparatus 100 according to an example embodiment of the present disclosure may arbitrarily select and display a predetermined number of, e.g. fifteen images from the storage of the display apparatus 100 as an initial screen to be displayed on the display 103, and displays the first text information about the displayed images and the second text information about images not displayed (S1001). To determine the second text information, various methods described as above are all employable, and text information may be randomly selected among the pieces of text information about the image not displayed.

After displaying the initial screen, the processor 102 senses a user's voice input (S1002), and analyzes the sensed voice input (S1003). When a user makes no inputs for a predetermined period of time, the processor 102 updates the second text information to show information different in category from the first text information (S1004), thereby inducing a user to make a voice input corresponding to the updated second text information. Further, when a user makes no inputs for the predetermined period of time, the processor 102 may change the image displayed on the screen and also change the first text information corresponding to the changed image.

As the voice input is sensed, the processor 102 analyzes the sensed voice input and replace at least some of the displayed images with an image having the text information corresponding to the voice input made by the user (S1005). However, as described above, there are no limits to the method of displaying the image having the text information corresponding to the user's voice input. For example, a new image may be additionally displayed while keeping all the already displayed images.

After displaying the new image, the processor 102 may update the first text information and also update the second text information according to the newly displayed image (S1006). As an example of the method of updating the first text information, a first text about the newly displayed image may be added to the existing first text, or replace a part of the existing first text. The method of updating the second text information may be equivalent to that described with reference to FIG. 9.

Furthermore, when a user utters a voice command for selecting one among the images displayed on the screen of the display 103, the processor 102 may display numbers respectively given to the images displayed on the screen, and the user may select one image by inputting a voice related to a corresponding number. In other words, the processor 102 may display information for guiding a user to make one among many photographs be specified with a voice. However, there are no limits to the method of displaying a guide to select one among the photographs.

In the foregoing example embodiments, the processor 102 displays an image stored in the storage of the display apparatus 100 on the display 103, but there are no limits to the source of the image to which the processor 102 can have an access. As described above, the processor 102 may receive an image from the SNS application 110 or obtain and display an image by directly accessing an SNS server, or may receive and display an image from the cloud server 120 or the mobile phone 130.

For example, when the processor 102 is capable of directly accessing the SNS server to obtain and display an image, there is an effect on making a user directly use a SNS through the display apparatus 100 according to the present disclosure. This example embodiment will be described in greater detail below with reference to FIG. 11.

The display apparatus 100 according to an example embodiment of the present disclosure may further include a communicator (e.g., including communication circuitry), and the processor 102 may receive the second image from the external apparatus through the communicator and display the second image on the display 103 when a voice input uttered by a user matches with the text information about the external apparatus, e.g., the second image stored in the SNS server.

Figure 11:
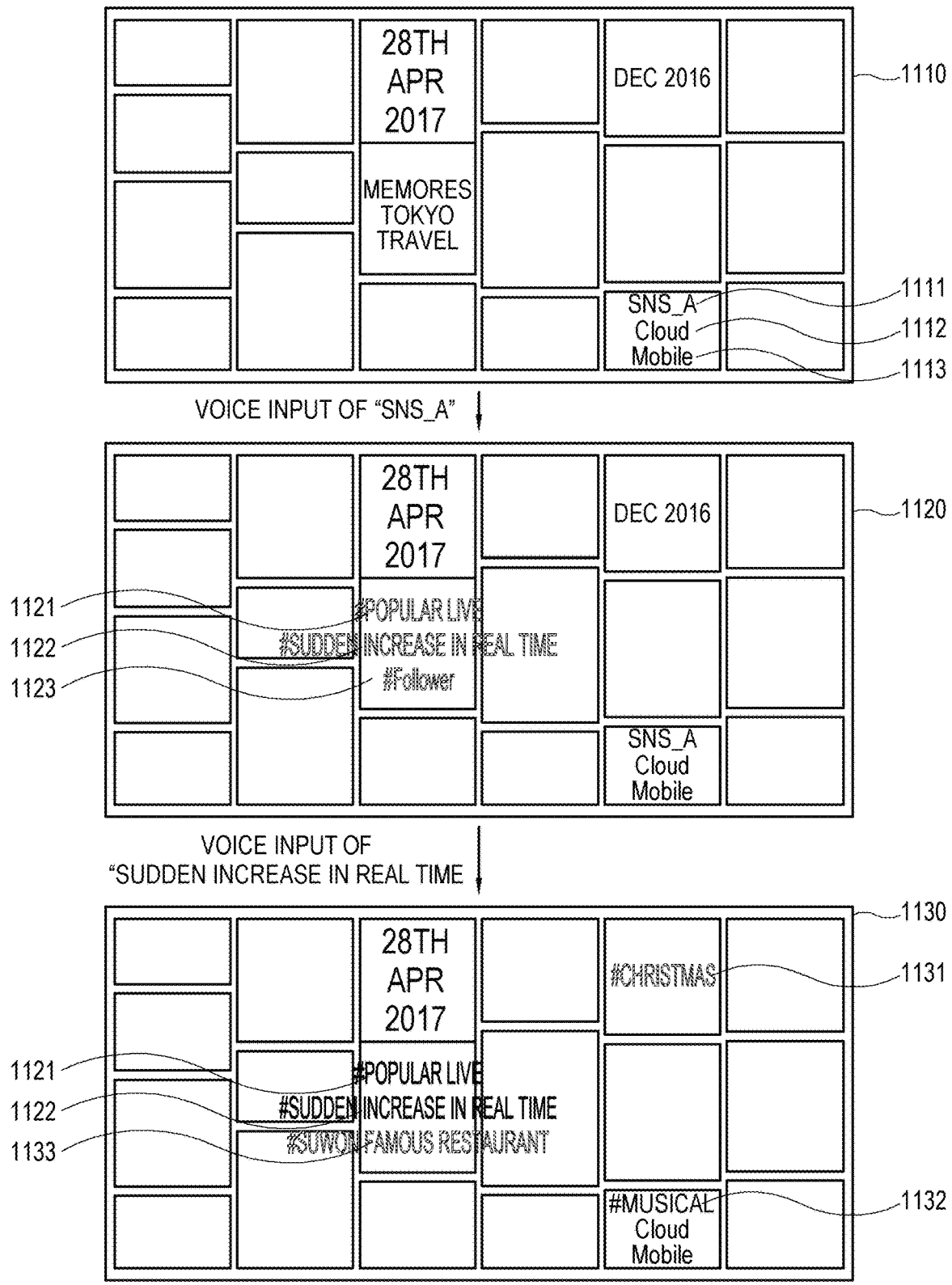
FIG. 11 is a diagram illustrating an example of viewing a social network service (SNS) image through a display apparatus according to an example embodiment of the present disclosure.

Referring to FIG. 11, the processor 102 of the display apparatus 100 according to an example embodiment of the present disclosure may display information about an image source on a screen 1110 as one piece of the second text information. For example, the processor 102 may display 'SNS_A' 1111 indicating an SNS called A, 'Cloud' 1112 indicating the cloud server, and 'Mobile' 1113 indicating a mobile phone, as the information about the image sources.

When a user utters "SNS_A" among them, the processor 102 may display an image provided from the SNS_A and information related to the service as the second text information on a screen 1120 in response to the utterance. For example, the processor 102 may display '#Popular Live' 1121, '#Sudden Increase In Real Time' 1122, and '#Follower' 1123 as the second text information about the SNS_A on the screen.

When a user utters a voice of "sudden increase in real time" by referring to the screen and the second text information, the processor 102 receives an image corresponding to the text information uttered by the user, e.g., "sudden increase in real time" from the SNS server in response to the uttered voice, and displays the received image on the screen 1130 of the display 103. For example, when text information about an image corresponding to '#Sudden Increase In Real Time' increases '#Christmas' 1131, '#Musical' 1132, and '#Suwon Famous Restaurant' 1133, the processor 102 may display the text information and the image related to the text information on the screen 1130 of the display 103.

Thus, a user may view various images stored in the external apparatus in addition to the images captured and stored by the user. For example, when a direct access to the SNS server storing an image is possible, the voice input to the display apparatus is enough for a user to directly use the SNS.

The display apparatus 100 according to an example embodiment of the present disclosure may generate text information corresponding to a predetermined image. This example embodiment will be described in greater detail below with reference to FIGS. 12 and 13.

Figure 12:
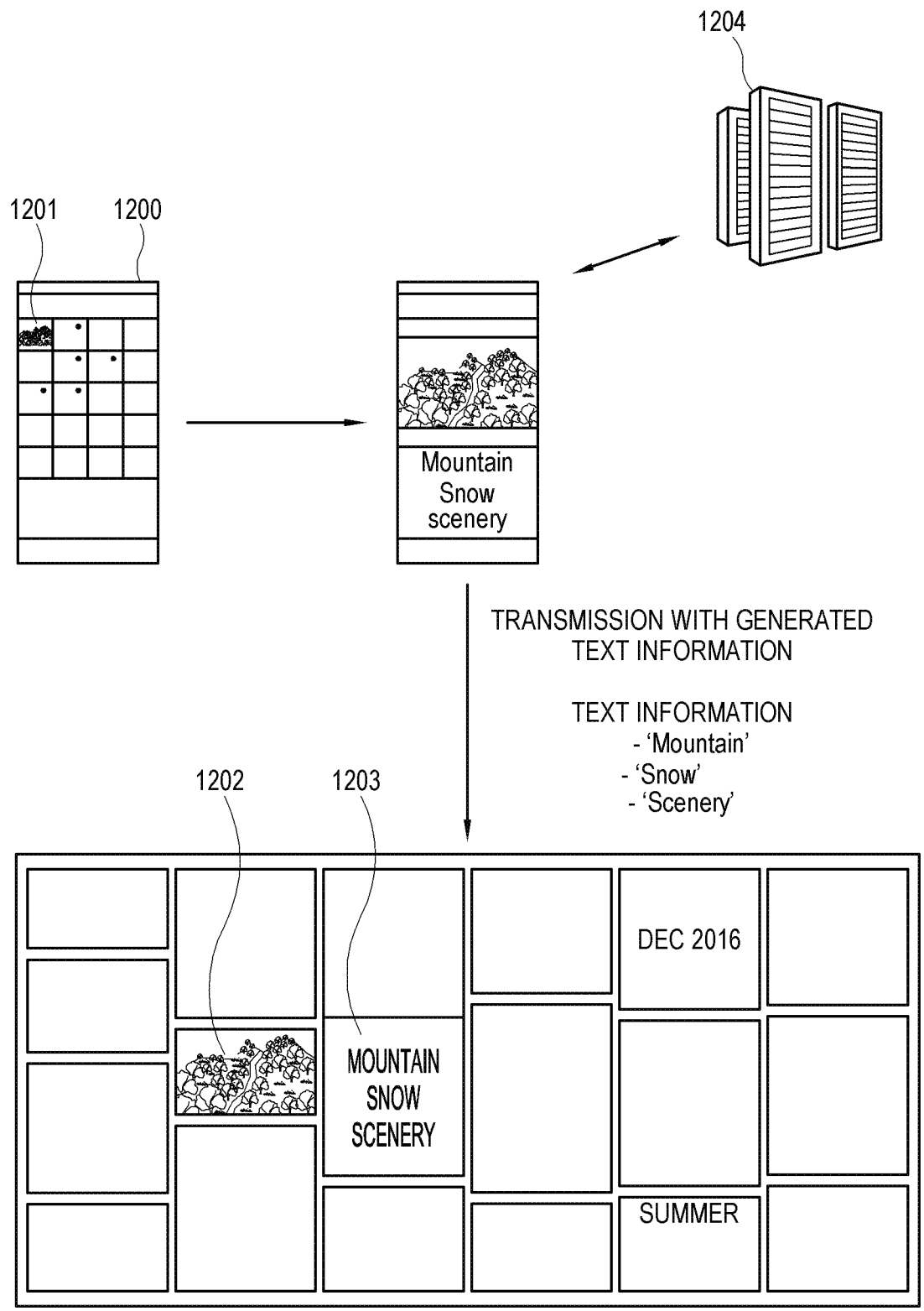
FIG. 12 is a diagram illustrating an example of automatically generating text information in a display apparatus according to an example embodiment of the present disclosure.

FIG. 12 is a diagram illustrating an example of automatically generating text information in a display apparatus according to an example embodiment of the present disclosure. In a case where there is no text information about a predetermined image when the image is displayed, the processor 102 of the display apparatus 100 according to an example embodiment of the present disclosure may generate the corresponding text information about the image through an image analysis.

For example, when a user of a mobile phone 1200 selects one photograph 1201 stored in the mobile phone 1200 to be transmitted to and displayed on the display apparatus 100, the processor 102 of the display apparatus 100 receives the photograph corresponding to the selection of the mobile phone user and displays it on the display. In this case, the processor 102 of the display apparatus 100 determines that no text information matches with the photograph, and generates the text information through an image analysis for the photograph. For example, when the photograph 1201 of FIG. 12 is received, the processor 102 generates 'Mountain', 'Snow' and 'Scenery' as the text information about the photograph through the image analysis, and displays a photograph 1202 and the generated text information 1203 as the first text information about the photograph on the screen of the display.

As a method of analyzing an image to generate text information, for example, and without limitation, there is deep learning or machine learning using a support vector machine (SVM) algorithm. Among them, the method may be achieved by an image recognition technique using the deep learning technique based on a convolutional neural network (CNN). However, the method may be achieved using various image recognition technique without limitations.

The processor 102 of the display apparatus 100 may make the server 1204 perform the image analysis without directly performing the image analysis. That is, when the photograph is received without the text information, the processor 102 determines that the photograph is received without the text information, and makes the external server 1204 perform the image analysis with regard to the photograph and generate the text information about the photograph, thereby receiving both the photograph and the text information generated in the server.

In the foregoing example embodiment, the text information is automatically generated when there is no text information about a predetermined image. Text information may be additionally generated even when there is text information about a predetermined image.

The processor 102 of the display apparatus 100 according to an example embodiment of the present disclosure may set text information corresponding to a predetermined image based on a history of using an SNS application or a user's history of uttering a voice input. This embodiment will be described with reference to FIG. 13.

Figure 13:
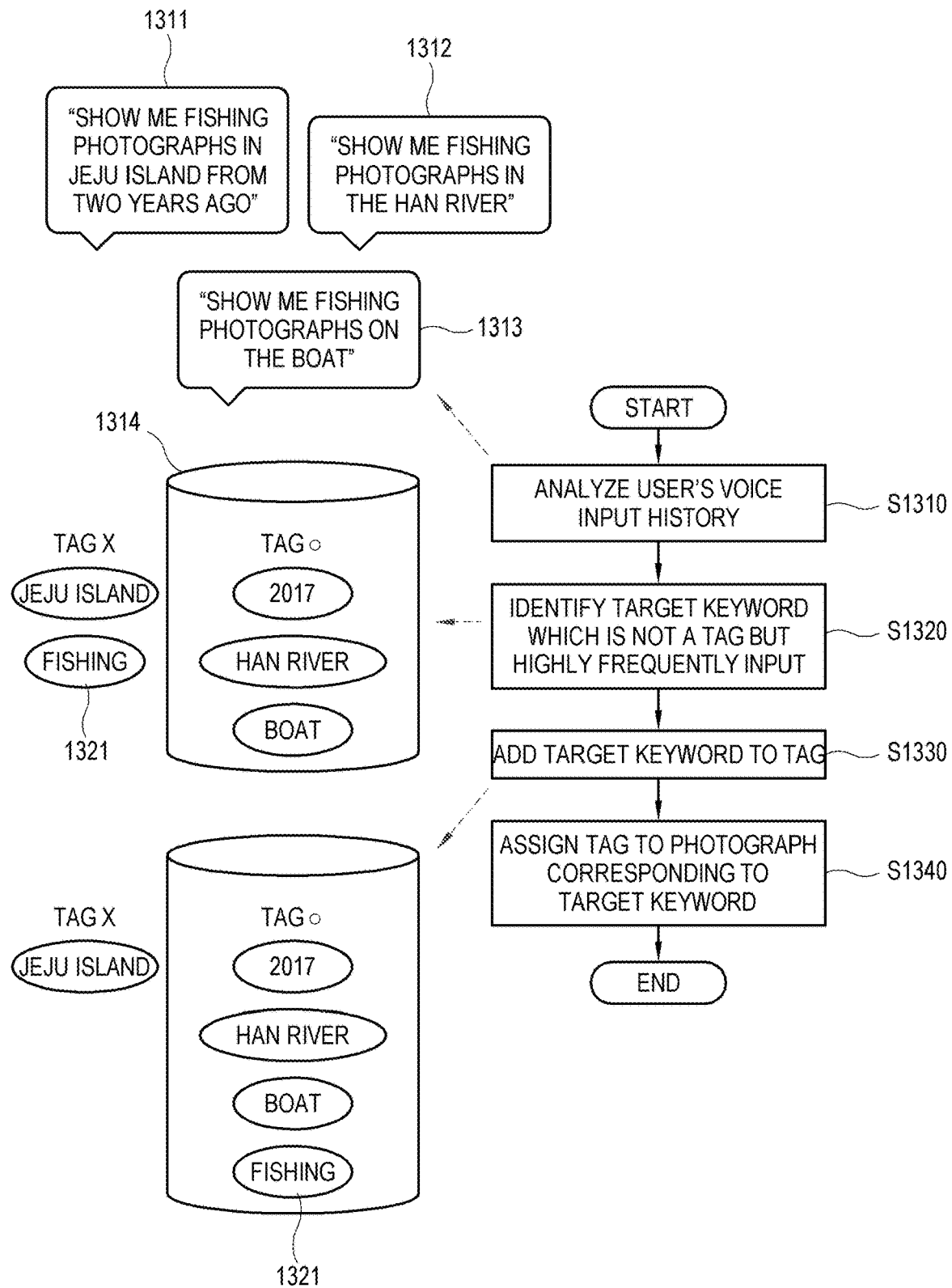
FIG. 13 is a diagram illustrating another example of automatically generating text information in a display apparatus according to an example embodiment of the present disclosure.

FIG. 13 is a diagram illustrating an example showing a situation that inputs such as "show me fishing photographs in Jeju island from two years ago" 1311, "show me fishing photographs in the Han River" 1312, "show me fishing photographs on the boat" 1313, etc. are given as the history of the user voice inputs, and '2017', 'Han River', and 'boat' in the voice inputs are stored or registered in a tag database (DB) 1314 as keywords corresponding to the text information. In this situation, the processor 102 of the display apparatus 100 according to an example embodiment of the present disclosure analyzes the user's voice input history (S1310), and determines a target keyword which is not registered in the tag DB as the keyword corresponding to the text information but highly frequently input (S1320). Referring to the example illustrated in FIG. 13, the processor 102 analyzes the user's voice input histories 1311, 1312, 1313 and determines 'fishing' 1321 as the target keyword.

After determining the target keyword, the processor 102 adds the determined target keyword to the tag DB as the keyword corresponding to the text information (S1330). Then, the processor 102 analyzes a predetermined image and determines whether the target keyword added to the tag DB is suitable for the text information about the image. When the target keyword is suitable, the processor 102 may assign the target keyword as the text information about the corresponding image (S1340), and make the target keyword be displayed on the screen of the display 103 in the future. That is, the processor 102 determines a keyword frequently used by a user and uses the determined keyword in automatically generating the text information.

A method of automatically generating text information corresponding to a predetermined image by referring to a user's history of using an SNS application is similar to that as described above.

Thus, the display apparatus of the present disclosure automatically generates text information about a predetermined image based on a keyword frequently used by a user, thereby enhancing the suitability of the automatically generated text information for the user.

Figure 14:
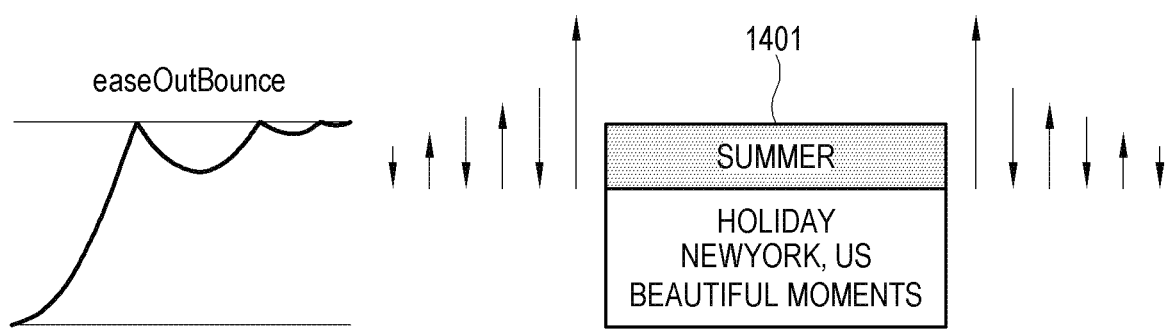
FIG. 14 is a diagram illustrating an example of graphics showing that a voice input is possible in a display apparatus according to an example embodiment of the present disclosure.

FIG. 14 is a diagram illustrating an example of graphics showing that a voice input is possible in a display apparatus according to an example embodiment of the present disclosure.

The display 103 of the display apparatus 100 according to an example embodiment of the present disclosure displays the text information in addition to the image, but a user may not recognize the purpose and function of the text information but regard as decoration or design. To inform a user that the text information is information activated to receive a user's input, the processor 102 of the display apparatus 100 according to an example embodiment of the present disclosure may give graphic effects to each text information. For example, as shown in FIG. 14, the processor 102 may give the graphic effects to specific text information 1401 as if the text information 1401 bounces up and down. However, there are no limits to the kind or content of graphic effects. For example, the processor 102 may make a guide message that the voice input for the text information is possible be displayed above the text information in the form of a graphic user interface (GUI), and/or output as separate voice guidance.

Thus, a user can recognize that the text information displayed on the screen is information activated to receive his/her input.

Figure 15:
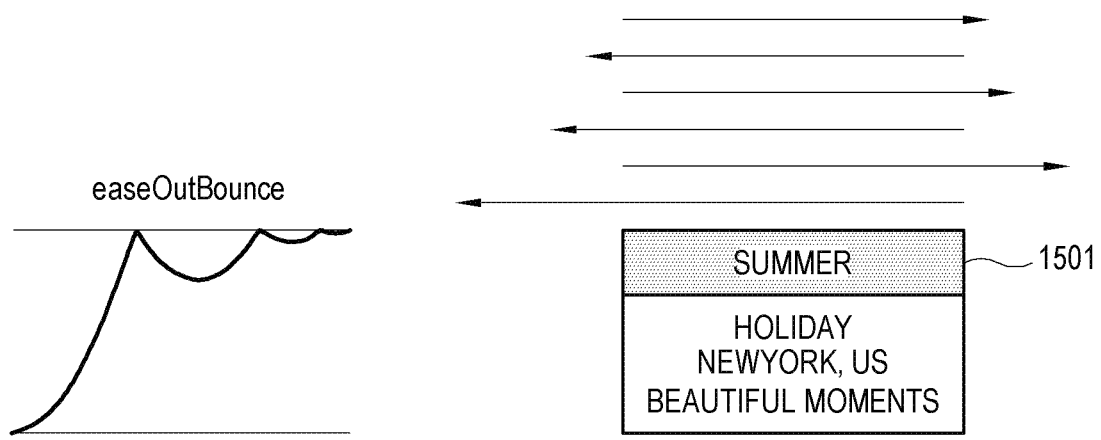
FIG. 15 is a diagram illustrating an example of graphics showing that voice recognition fails in a display apparatus according to an example embodiment of the present disclosure.

FIG. 15 is a diagram illustrating an example of graphics showing that voice recognition fails in a display apparatus according to an example embodiment of the present disclosure;

A user, who recognizes that the text information displayed on the display 103 of the display apparatus 100 according to an example embodiment of the present disclosure is information activated to receive his/her input, utters a voice corresponding to the displayed text information, the processor 102 of the display apparatus 100 needs to inform the user of whether the voice uttered by him/her is recognized or not. To this end, the processor 102 of the display apparatus 100 according to an example embodiment of the present disclosure may give graphic effects to the displayed text information in accordance with whether the voice input uttered by a user matches with the text information. For example, as shown in FIG. 15, the processor 102 may give the graphic effects to specific text information 1501 as if the text information 1501 bounces left and right. However, there are no limits to the kind or content of graphic effects.

Thus, a user can check whether the display apparatus recognizes a voice command issued by him/her, and then proceeds with subsequent operations.

Figure 16:
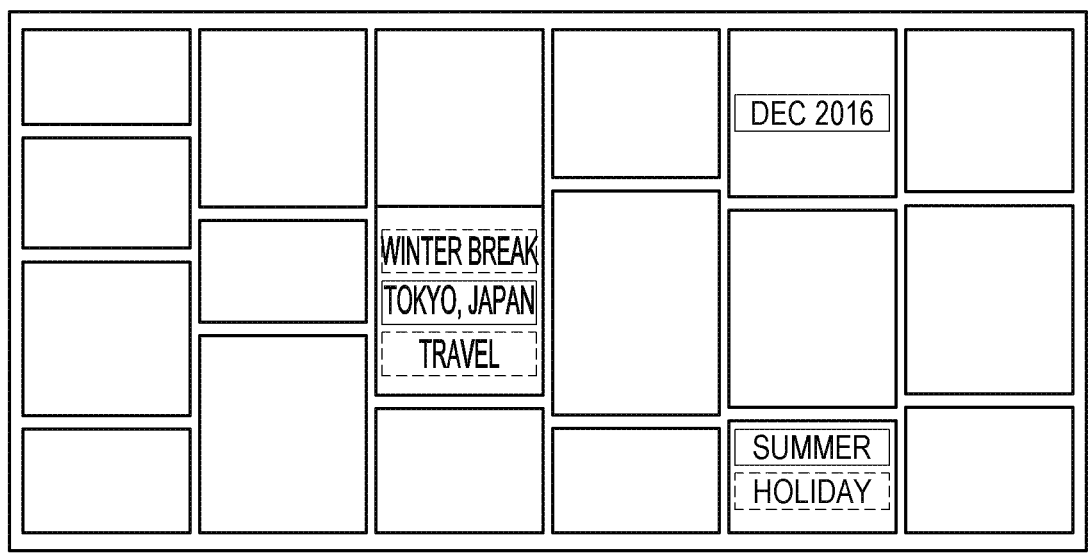
FIG. 16 is a diagram illustrating an example of displaying text information distinguishable according to sorts in a display apparatus according to an example embodiment of the present disclosure.

FIG. 16 is a diagram illustrating an example of displaying text information distinguishable according to sorts in a display apparatus according to an example embodiment of the present disclosure;

The display 103 of the display apparatus 100 according to an example embodiment of the present disclosure may display text information together with the image, in which the text information includes two types, e.g., the first text information about the image displayed, and the second text information about the image not displayed. Further, as described above, there is a difference between functions provided by the display apparatus according to what type of text information a voice uttered by a user corresponds to. For example, when a user utters a voice corresponding to the first text information, the processor 102 of the display apparatus 100 displays an additional image related to the first image being currently displayed on the screen. Therefore, the user can successively view images relevant to the currently displayed image. On the other hand, when a user utters a voice corresponding to the second text information, the processor 102 of the display apparatus 100 displays an image different from the first image being currently displayed on the screen. Therefore, a user can search and view images different in content from the currently displayed image.

Like this, since different functions are provided according to the input of the first text information or the second text information, the processor 102 of the display apparatus 100 according to an example embodiment of the present disclosure has to display the first text information and the second text information distinguishably from each other.

As an example of a method of displaying the first text information and the second text information distinguishably from each other, the processor 102 may display the text information on distinguishable areas as illustrated in FIG. 8. The processor 102 may display the text information with different frames according to the types of the text information as illustrated in FIG. 16. However, there are no limits to the method of displaying the first text information and the second text information to be distinguishable from each other.

Thus, a user can visually distinguish between the first text information and the second text information which are different in function from each other, and thus more intuitively use an image view service.

Figure 17:
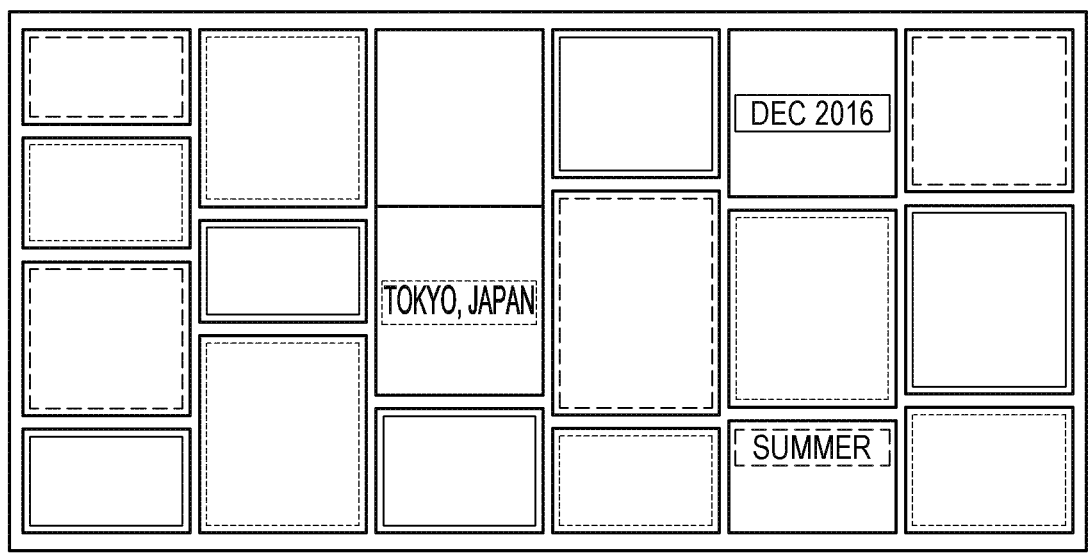
FIGS. 17, 18 and 19 are diagrams illustrating various examples showing correlations between text information and displayed images in a display apparatus according to an example embodiment of the present disclosure.
Figure 18:
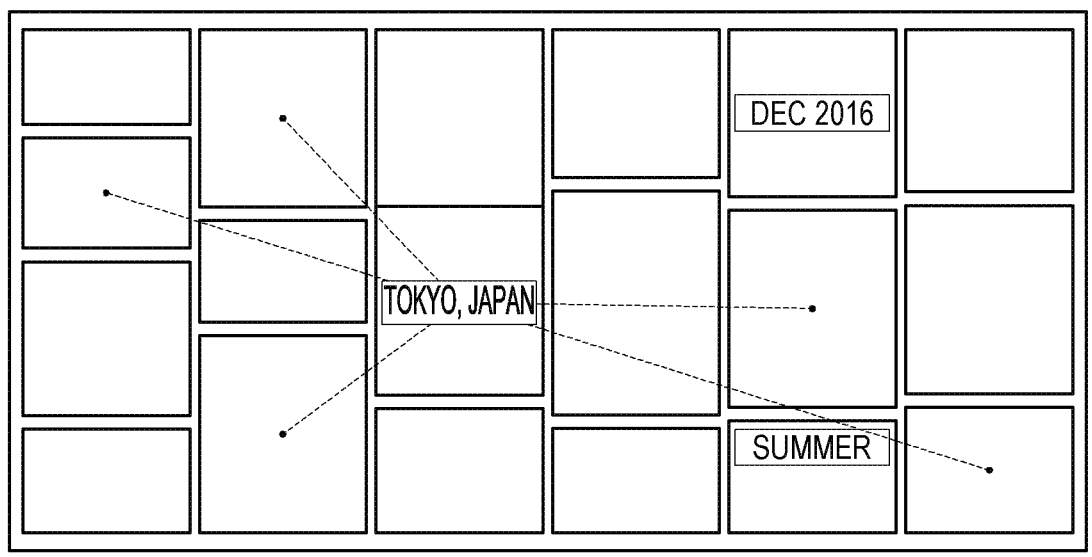
Figure 19:
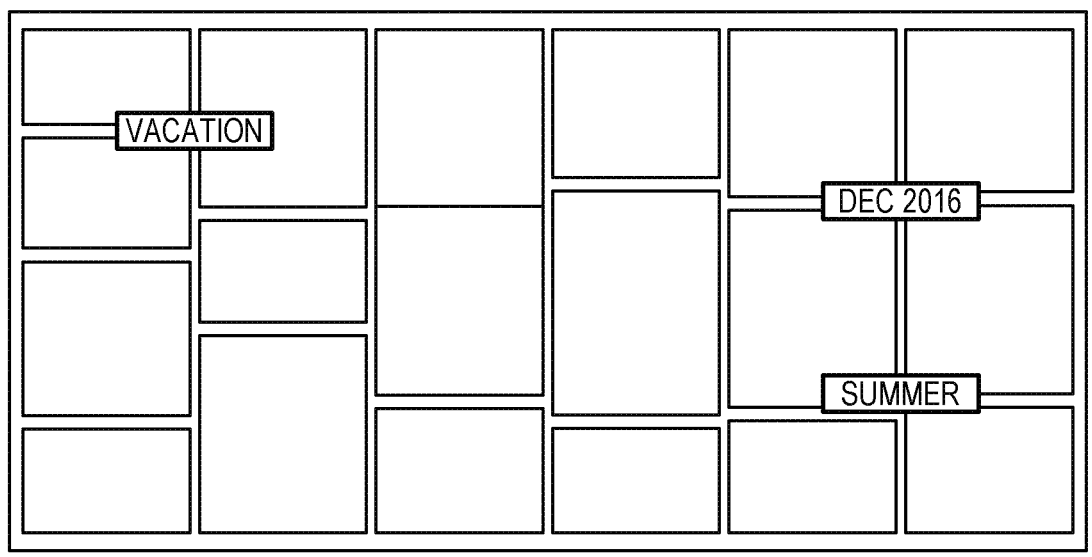

FIGS. 17, 18 and 19 illustrate various examples showing correlations between text information and displayed images in a display apparatus according to an example embodiment of the present disclosure.

The processor 102 of the display apparatus 100 according to an example embodiment of the present disclosure may distinguishably show a correlation between the displayed image and the corresponding text information. Since the display 103 of the display apparatus 100 according to an example embodiment of the present disclosure displays the text information in addition to the image, and the text information includes the first text information about the image displayed on the screen, it may be useful for a user that information about which text information matches with images displayed on the screen is visually given.

There may be various methods of showing a correlation between the image displayed on the screen of the display 103 and the text information corresponding to the image. For example, as illustrated in FIG. 17, each text information and its matching images may be framed using the same color, thereby showing a correlation between them with color. As illustrated in FIG. 18, each text information and its matching images are connected by lines, thereby showing a correlation between them. As illustrated in FIG. 19, each text information and its matching images are arranged to be adjacent to one another, thereby showing a correlation between them based on a structure. Besides, any visual methods are possible as long as they can show the correlation.

Thus, a user can visually grasp a correlation between the text information and the matching images displayed on the screen, and thus more intuitively use the image view service.

Figure 20:
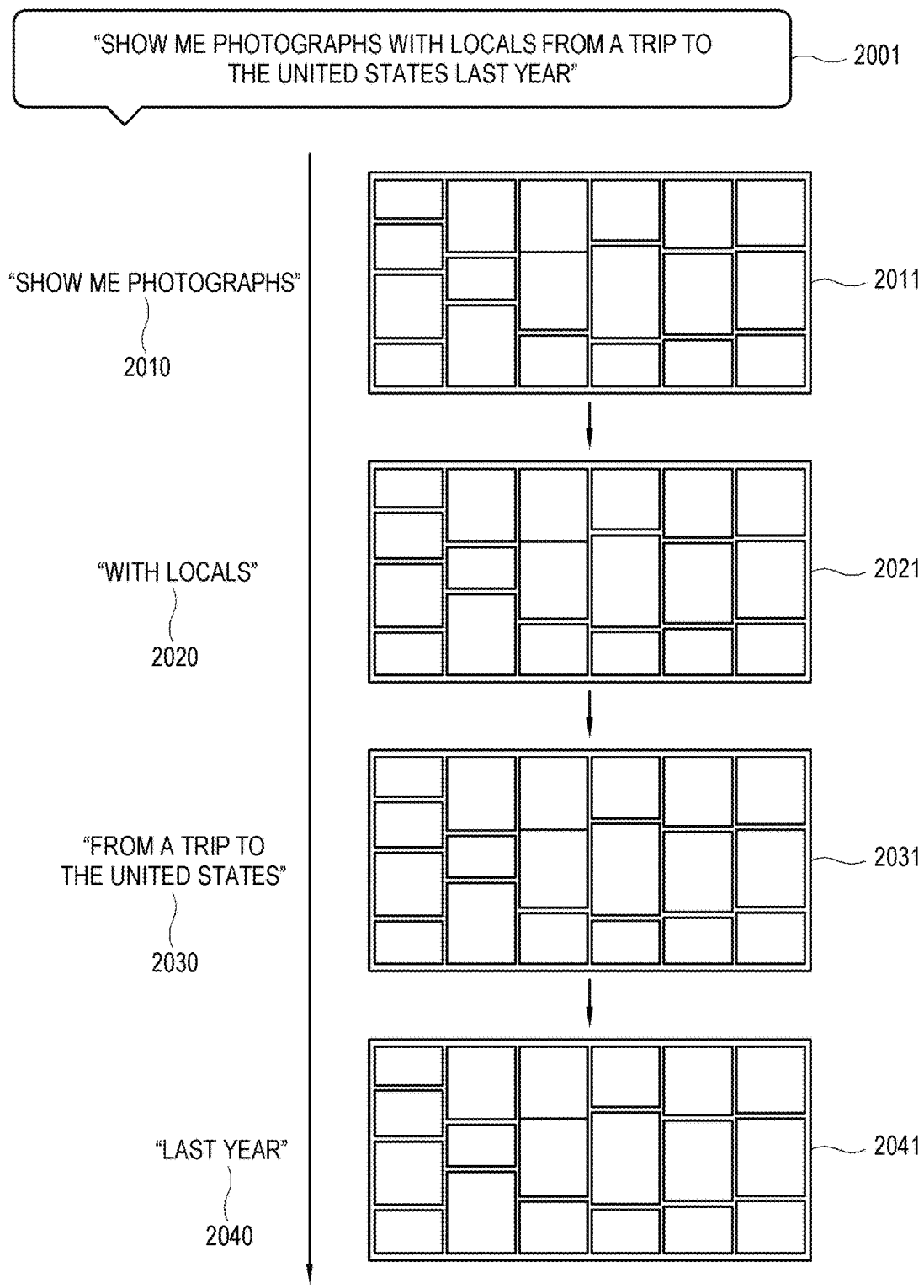
FIG. 20 is a diagram illustrating an example showing that second images are sequentially displayed in response to a voice input including a plurality of words in a display apparatus according to an example embodiment of the present disclosure.

FIG. 20 is a diagram illustrating an example showing that second images are sequentially displayed in response to a voice input including a plurality of words in a display apparatus according to an example embodiment of the present disclosure.

To the display apparatus 100 according to an example embodiment of the present disclosure, a user may utter a voice in units of sentence including a plurality of words. In this case, the processor 102 of the display apparatus 100 may display second images, which correspond to the words included in the voice uttered by the user, on the display 103 in sequence according to the words.

Referring to FIG. 20, for example, when a user utters a voice of "show me photographs with locals from a trip to the United States last year" 2001, the processor 102 of the display apparatus 100 receives the voice and displays an image corresponding to the voice on the screen of the display 103. In this case, the processor 102 of the present embodiment does not display the images corresponding to one sentence after utterance of one sentence is completed, but sequentially displays the images corresponding to the words included in a user's utterance according to the words. For example, the processor 102 displays images 2011 corresponding to "show me photographs" 2010 on the screen immediately when the utterance of "show me photographs" 2010 is received, displays images 2021 corresponding to "with locals" 2020 on the screen immediately when the utterance of "with locals" 2020 is received, displays images 2031 corresponding to "from a trip to the United States" 2030 on the screen immediately when receiving the utterance of "a trip to the United States" 2030, and displays images 2041 corresponding to "last year" 2040 on the screen immediately when receiving the utterance of "last year" 2040, Thus, the image view service is immediately provided in response to a user's voice input.

As described above, according to an example embodiment, it is easy and convenient for a user to change an image displayed on a screen of a display apparatus through a voice input.

Although various example embodiments have been shown and described, it will be appreciated by those skilled in the art that changes may be made in these example embodiments without departing from the principles and spirit of the disclosure, the scope of which is defined in the appended claims and their equivalents.

What is claimed is:

1. A display apparatus comprising:
a display;
a user input receiver comprising receiving circuitry configured to receive a voice input uttered by a user; and
a processor configured to:
display at least one first image and first text information on the display, the first text information being related to the at least one first image and at least one second image which is not displayed on the display; and
in response to receiving the voice input corresponding to the first text information uttered by the user, display the at least one second image and second text information on the display, the second text information being related to the at least one first image, the at least one second image and at least one third image which is not displayed on the display,
wherein at least one of the first text information or the second text information includes at least one information among: a capture date, a capture location and tag information of at least one of the at least one first image or the at least one second image.

2. The display apparatus according to claim 1, wherein the processor is configured to: display the first text information relating to at least one first image among a plurality of first images on the display, and display a new image corresponding to the first text information relating to the first image on the display based on the voice input corresponding to the first text information about the first image uttered by the user.

3. The display apparatus according to claim 2, wherein the processor is configured to: display the new image corresponding to the user's voice input on the display in different ways based on whether the voice input uttered by the user corresponds to the first text information relating to the first image or the first text information relating to the at least one second image.

4. The display apparatus according to claim 1, further comprising a sensor,
wherein the processor is configured to: sense a user or surrounding environment of the display apparatus via the sensor, and identify the first text information and the second text information based on information of the sensed user or the sensed surrounding environment of the display apparatus.

5. The display apparatus according to claim 2, wherein the processor is configured to: identify the second text information relating to the at least one second image to belong to a different category from the first text information relating to the first image, or the voice input previously uttered by the user, based on the user input receiver receiving no inputs for a predetermined period of time, or based on the voice input corresponding to the first text information relating to the at least one second image being input.

6. The display apparatus according to claim 1, further comprising a communicator comprising communication circuitry,
wherein the second text information relates to at least one second image stored in an external apparatus, and
the processor is configured to: receive the at least one second image from the external apparatus via the communicator and display the at least one second image and the second text information on the display based on the voice input corresponding to the first text information uttered by the user.

7. The display apparatus according to claim 1, wherein the processor is configured to set the first text information corresponding to a predetermined image based on at least one of a usage history of a social network service (SNS) application or a history of voice input.

8. The display apparatus according to claim 1, wherein the processor is configured to display the first text information relating to the first image and the first text information and the second text information relating to the at least one second image distinguishably from each other.

9. The display apparatus according to claim 1, wherein the processor is configured to apply graphic effects to the displayed first text information based on whether the voice input uttered by the user corresponds to the first text information.

10. The display apparatus according to claim 1, wherein the processor is configured to display a correlation between the displayed image and corresponding text information.

11. The display apparatus according to claim 1, wherein the voice input comprises a plurality of words, and
the processor is configured to display at least one second image corresponding to each word of the plurality of words on the display in sequence.

12. A method of controlling a display apparatus, the method comprising:
simultaneously displaying at least one first image and first text information on a display, the first text information describing at least part of each of the at least one first image and at least one second image which is not displayed on the display, the second image being a different image than the first image; and
in response to receiving a voice input corresponding to the first text information uttered by the user, displaying the at least one second image and second text information on the display, the second text information being related to the at least one first image, the at least one second image and at least one third image which is not displayed on the display when displaying the at least one second image and the second text information in response to receiving the voice input,
wherein at least one of the first text information or the second text information includes at least one information among a capture date, a capture location and tag information of at least one of the at least one first image or the at least one second image.

13. The method according to claim 12, further comprising:
displaying the first text information relating to at least one first image among a plurality of first images on the display; and displaying a new image corresponding to the first text information relating to the first image on the display based on the voice input corresponding to the first text information about the first image uttered by the user.

14. The method according to claim 13, further comprising displaying the new image corresponding to the user's voice input on the display in different ways based on whether the voice input uttered by the user corresponds to the first text information relating to the first image or the first text information relating to the second image.

15. The method according to claim 12, further comprising sensing a user or surrounding environment of the display apparatus, and identifying the first text information and the second text information based on information of the sensed user or the sensed surrounding environment of the display apparatus.

16. The method according to claim 13, further comprising identifying the second text information relating to the second image to belong to a different category from the first text information relating to the first image or the voice input previously uttered by the user, based on a user input receiver receiving no inputs for a predetermined period of time or based on the voice input corresponding to the first text information relating to the second image being input.

17. The method according to claim 12, wherein the second text information relates to a second image stored in an external apparatus, and the method further comprises receiving the second image from the external apparatus and displaying the second image and the second text information on the display based on the voice input corresponding to the first text information uttered by the user.

18. The method according to claim 12, further comprising setting the first text information corresponding to a predetermined image based on at least one of a usage history of a social network service (SNS) application or a history of voice input.

19. The method according to claim 12, further comprising displaying the first text information relating to the first image and the first text information and the second text information relating the second image distinguishably from each other.

20. The method according to claim 12, further comprising applying graphic effects to the displayed first text information based on whether the voice input uttered by the user corresponds to the first text information.

21. The method according to claim 12, further comprising displaying a correlation between the displayed image and corresponding text information.

22. The method according to claim 12, wherein the voice input comprises a plurality of words, and the method further comprises displaying second images corresponding to each word of the plurality of words on the display in sequence.

23. A computer program product comprising a non-transitory computer readable storage medium having a computer program stored thereon, which, when executed by a processor of a device, causes the device to execute the method according to claim 12.

* * * * *